United States Patent
Wu

(10) Patent No.: US 12,319,508 B2
(45) Date of Patent: Jun. 3, 2025

(54) SPIRAL CONVEYOR

(71) Applicant: YANGZHOU WELDON TRANSMISSION EQUIPMENT CO., LTD, Yangzhou (CN)

(72) Inventor: Baodong Wu, Yangzhou (CN)

(73) Assignee: YANGZHOU WELDON TRANSMISSION EQUIPMENT CO., LTD, Yangzhou (CN)

( * ) Notice: Subject to any disclaimer, the term of this patent is extended or adjusted under 35 U.S.C. 154(b) by 0 days.

(21) Appl. No.: 18/023,727

(22) PCT Filed: Jul. 1, 2021

(86) PCT No.: PCT/CN2021/104023
§ 371 (c)(1),
(2) Date: Feb. 28, 2023

(87) PCT Pub. No.: WO2022/236949
PCT Pub. Date: Nov. 17, 2022

(65) Prior Publication Data
US 2024/0034566 A1 Feb. 1, 2024

(30) Foreign Application Priority Data
May 11, 2021 (CN) .......................... 202110511078.X

(51) Int. Cl.
*B65G 15/02* (2006.01)
*B65G 15/54* (2006.01)

(52) U.S. Cl.
CPC .............. *B65G 15/02* (2013.01); *B65G 15/54* (2013.01); *B65G 2207/24* (2013.01); *B65G 2207/44* (2013.01)

(58) Field of Classification Search
CPC .... B65G 15/02; B65G 15/54; B65G 2207/24; B65G 2207/44
See application file for complete search history.

(56) References Cited

U.S. PATENT DOCUMENTS 3,946,857 A * 3/1976 Fraioli, Sr. ........... B65G 17/086
198/838
2015/0090560 A1 4/2015 Talsma et al.
(Continued)

FOREIGN PATENT DOCUMENTS

CN 200996766 Y 12/2007
CN 105263828 B 4/2017
(Continued)

OTHER PUBLICATIONS

CN1216027, May 1999.*
RU2735785, Nov. 2020.*

*Primary Examiner* — Gene O Crawford
*Assistant Examiner* — Lester Rushin, III
(74) *Attorney, Agent, or Firm* — Bayramoglu Law Offices LLC

(57) ABSTRACT

A spiral conveyor includes a mesh chain spirally wound around and rotate synchronously with an outer circumference of each rotary drums. The inner side of each chain link of the mesh chain close to the rotary drum is provided with a drive head extending towards a drum body of the rotary drum. The drive head is provided with a convex-arc edge and includes an arc slot provided on each of two sides or on a single side of the drive head. Driving poles are evenly distributed around the outer circumference of the rotary drum and engage with the drive heads of each layer. When the inner side of the mesh chain adapts to the perimeter of the outer side of the mesh chain, the drive head on the inner side of the mesh chain engages with the driving pole.

19 Claims, 23 Drawing Sheets

(56) References Cited

U.S. PATENT DOCUMENTS

2023/0124209 A1* 4/2023 Dingnis ............... B65G 17/086
                                                    198/778
2024/0059494 A1* 2/2024 Chang .................... B65G 43/00

FOREIGN PATENT DOCUMENTS

| CN | 106829320 A | 6/2017 |
| CN | 206314493 U | 7/2017 |
| CN | 107352231 A | 11/2017 |
| CN | 111498380 A | 8/2020 |
| CN | 112027452 A | 12/2020 |
| CN | 112027515 A | 12/2020 |
| CN | 212133003 U | 12/2020 |
| CN | 213066720 U | 4/2021 |
| CN | 113022954 A | 6/2021 |
| EP | 0578523 A1 | 1/1994 |

* cited by examiner

C-C

SPIRAL CONVEYOR

CROSS REFERENCES TO THE RELATED APPLICATIONS

This application is the national phase entry of International Application No. PCT/CN2021/104023, filed on Jul. 1, 2021, which is based upon and claims priority to Patent Applications No. CN 202110511078.X, filed on May 11, 2021, the entire contents of which are incorporated herein by reference.

TECHNICAL FIELD

The present disclosure relates to a conveyor, in particular to a spiral conveyor, and belongs to the technical field of conveyors.

BACKGROUND

In the baked food production line, foods are baked at high temperatures. High-temperature foods cannot be packaged immediately after they are taken out of the oven, and they must be cooled for a long time before being packaged. The spiral conveyor has been widely used in the food baking industry due to its small footprint, long conveying distance, and long cooling time.

The existing spiral conveyor has the following shortcomings.

1. When the mesh chain enters the turning transition section from the straight travel section, the inner sides of the chain links of the mesh chain need to get close to each other to adapt to the change in the outer perimeter of the mesh chain. However, poor engagement is likely to occur at the turning transition section. Alternatively, when the inner side of the mesh chain has not adapted to the change in the outer perimeter, the drive head engages with the driving pole in advance, such that the inner side of the mesh chain is subject to the reverse restriction of the driving pole, resulting in that the traction of the straight travel section to the inner side of the turning transition section is restricted. When the continuous inadaptability of the inner side of the mesh chain accumulates to a certain extent, the length of the outer side of the mesh chain is less than the theoretical perimeter, making the outer side of the mesh chain tight. To reduce the above phenomenon, a complex auxiliary structure is introduced to the existing spiral conveyor to make the drive head on the inner side of the mesh chain engage with the driving pole. However, to make the drive head smoothly engage with the driving pole, the mesh chain must travel along the tower body for a sufficient angle and height.

2. The rotation of the rotary drum is usually realized by a main drive sprocket that drives a drum sprocket through a chain. Due to the large transmission ratio between the main drive sprocket and the drum sprocket and the large load transferred, slippage easily occurs between the main drive sprocket and the chain, thus affecting the working stability of the equipment.

3. To cope with the long length of the mesh chain, a tensioner is usually provided. The floating of the counterweight compensates for the length of the mesh chain, but it exerts an additional drag force on the mesh chain. In addition, the jumping of the counterweight brings a large impact load to the mesh chain, making the mesh chain subject to easy deformation and fracturing due to the impact movement and increasing the wear between the mesh chain and the support rail.

4. According to the process requirements, double-tower conveying is sometimes required. As the conveying distance is too long, when the mesh chain is wound on the second tower from the transition section, a synchronization error is likely to occur between the two towers. As a result, the tightness of the mesh chain is uneven, and the mesh chain cannot always be maintained in a stable slack state.

SUMMARY

To overcome the problems of the prior art, an objective of the present disclosure is to provide a spiral conveyor, which features a small footprint, ensures smooth operation and turning of a mesh chain, and can keep the mesh chain moving smoothly in a slack state.

To solve the above problem, the present disclosure provides a spiral conveyor. The spiral conveyor includes rotary drums, where a mesh chain is spirally wound around the outer circumference of each of the rotary drums and rotates synchronously with each of the rotary drums. The inner side of each chain link of the mesh chain close to the rotary drum is provided with a drive head extending toward the drum body of the rotary drum. The drive head is provided with a convex-arc edge (e.g., inner or outer), includes an arc slot provided on each of the two sides or a single side of the drive head, and coincides with a driving pole. The driving poles are evenly distributed around the outer circumference of the rotary drum and engage with the drive heads of each layer. The bottom of the mesh chain of each layer is supported on a spiral ring rail to allow sliding. The spiral ring rail of each layer is fixed to radial support rods. Each of the radial support rods includes an outer end fixed to a vertical post. Vertical posts are evenly distributed around an axis of the rotary drum.

As a further improvement of the present disclosure, the mesh chain enters an arc spiral section from a straight travel section through a turning transition section. Chain pins at the straight travel section are parallel with each other, and chain pins at the arc spiral section are distributed in a fan shape. The outer side of the mesh chain at the turning transition section forces a loose inner side of the mesh chain to adjust its position. When the inner side of the mesh chain contacts the perimeter of the outer side of the mesh chain, the drive head on the inner side of the mesh chain engages with the driving pole.

As a further improvement of the present disclosure, an arc-shaped limiting plate is provided below a turning transition section, and the mesh chain turns and moves forward along a limiting arc of the arc-shaped limiting plate. The radius of the limiting arc is equal to or less than the distance between the head end of the limiting arc and the axis of the rotary drum. The axis of the limiting arc deviates from the axis of the rotary drum, such that the distance between the tail end of the limiting arc and the axis of the rotary drum is less than the distance between the head end of the limiting arc and the axis of the rotary drum.

As a further improvement of the present disclosure, the outer side of each chain link of the mesh chain is provided with a downwardly extending limiting protrusion; each limiting protrusion slides against an outer arc surface of the arc-shaped limiting plate.

As a further improvement of the present disclosure, each chain link of the mesh chain is provided with a first pin hole and a second pin hole that run along a width direction of the mesh chain. Cross sections of the first pin hole and the second pin hole are oval-shaped extending along a forward direction of the mesh chain. The front side walls of the first pin holes of multiple chain teeth on the outer side of the mesh chain incline forward along a slope. The back side walls of the second pin holes of the multiple chain teeth on the outer side of the mesh chain incline backward along another slope.

As a further improvement of the present disclosure, the outer side of each chain link of the mesh chain is provided with a downwardly extending limiting protrusion; a bottom of an outer arc surface of the arc-shaped limiting plate is provided with an outwardly extending limiting flash; multiple limiting rollers or limiting balls are fixed to the limiting flash; each limiting protrusion slides against a limiting roller or limiting ball.

As a further improvement of the present disclosure, the outer side of each chain link of the mesh chain is provided with a downwardly extending limiting shaft; each limiting shaft is provided thereon with a limiting bearing; each limiting bearing slides against an outer arc surface of the arc-shaped limiting plate.

As a further improvement of the present disclosure, the outer side of each chain link of the mesh chain is provided with a downwardly extending chain lug; a free end of each lug is provided with a limiting roller or limiting ball; each limiting roller or limiting ball slides against an outer arc surface of the arc-shaped limiting plate.

As a further improvement of the present disclosure, multiple vertical drum rods are evenly arranged along the circumference of each of the rotary drums; each driving pole is fixed to an outer vertical surface of the vertical drum rod.

As a further improvement of the present disclosure, one end of each vertical drum rod is fixed with a guide element. The guide element is located at a bottom of the rotary drum of an ascending spiral or the top of the rotary drum of a descending spiral. Each guide element is provided with a circular-arc guide surface and an inclined-arc guide surface in a smooth fit. The circular-arc guide surface is coaxial with the rotary drum and has a radius equal to or less than the radius of the rotary drum. The circular-arc guide surface in the ascending spiral is downward, and the circular-arc guide surface in the descending spiral is upward. Each driving pole in the ascending spiral is inserted from a central part of the inclined-arc guide surface in a width direction and extends to the bottom of the circular-arc guide surface; each driving pole in the descending spiral is inserted from a central part of the inclined-arc guide surface in a width direction and extends to a top of the circular-arc guide surface. The outer edge of each driving pole is tangential to the circular-arc guide surface. The outer side of the mesh chain at a turning transition section forces a loose inner side of the mesh chain to adjust its position. The inner side of the mesh chain slides along the circular-arc guide surface of the guide element until the inner side of the mesh chain contacts the perimeter of the outer side of the mesh chain, such that the drive head on the inner side of the mesh chain engages with the driving pole.

As a further improvement of the present disclosure, one end of each vertical drum rod is fixed with a floating element; the floating element is located at a bottom of an ascending spiral of the rotary drum or the top of a descending spiral of the rotary drum. The floating element is provided with an arc ridge inclining towards a forward direction of the mesh chain. The lower end of each driving pole in the ascending spiral is spliced with the arc ridge, and the upper end of each driving pole in the descending spiral is spliced with the arc ridge. The outer edge of each arc ridge is flush with or higher than the outer edge of the driving pole. The outer side of the mesh chain at a turning transition section forces a loose inner side of the mesh chain to adjust its position. The inner side of the mesh chain slides along the arc ridge of the floating element until the inner side of the mesh chain adapts to a perimeter of the outer side of the mesh chain, such that the drive head on the inner side of the mesh chain engages with the driving pole.

As a further improvement of the present disclosure, the back surface of the floating element is embedded in a vertical slot of the vertical drum rod; a central part of the vertical slot in a width direction is provided with a vertical projection; the vertical projection is embedded in a floating slot on the back surface of the floating element; a floating spring includes one end embedded in the vertical projection and the other end embedded in a counterbore of the floating element.

As a further improvement of the present disclosure, an inlet of the turning transition section is provided with an inner sprocket and an outer sprocket; the inner sprocket engages with the inner side of the chain link of the mesh chain; the outer sprocket engages with an outer side of the chain link of the mesh chain; the inner sprocket has the same speed and the same number of teeth as the outer sprocket; the pitch diameter of the outer sprocket is larger than the pitch diameter of the inner sprocket.

As a further improvement of the present disclosure, there are two rotary drums arranged side by side, namely a left rotary drum and a right rotary drum. A mesh chain input section moves to the right to enter the turning transition section and enter an ascending spiral of the left rotary drum and tangentially moves to the right to enter a mesh chain transition section from an upper part of the left rotary drum. The mesh chain transition section moves to the right to enter the turning transition section and enter a descending spiral of the right rotary drum and tangentially moves to the right to enter a mesh chain output section from a lower part of the right rotary drum. The mesh chain output section passes a right steering wheel and moves to the left to enter a mesh chain return section; the left end of the mesh chain return section bypasses a left steering wheel and is connected with the mesh chain input section.

As a further improvement of the present disclosure, the two rotary drums each include a center supported on a frame through a central shaft and a bottom fixed with a drum sprocket. The main drive sprocket and a tensioning sprocket are arranged between the two drum sprockets. The transmission chain bypasses the main drive sprocket and the tensioning sprocket and is connected with the two drum sprockets in a transmission manner. Each chain link of the transmission chain includes a pair of mutually parallel outer chain plates. The ends of the outer chain plates of each two adjacent chain links are hinged to each other through an inner joint. The left end of the inner joint is provided with a pair of mutually parallel inner chain plates. Each pair of inner chain plates are attached to the inner sides of the right ends of a previous pair of outer chain plates and are connected. The right end of the inner joint is provided with an engaging end. The engaging end is located between and hinged to the left ends of a subsequent pair of outer chain plates through a first chain pin. The engaging end is provided with an oblique engaging surface. The main drive sprocket is provided with a trapezoidal tooth. The slope of the trapezoidal tooth engages with the oblique engaging surface at a lower part of the engaging end.

As a further improvement of the present disclosure, a roller is provided between each pair of inner chain plates and is provided in the central part of a second chain pin. Two ends of the second chain pin respectively pass through pin holes of the inner chain plates and are riveted to the right ends of the previous pair of outer chain plates respectively. The inner chain plates are integrally connected with, or through the second chain pin, hinged to the right ends of the previous pair of outer chain plates.

As a further improvement of the present disclosure, at least one slat chain is provided below a mesh chain transition section; the slat chain wraps around a slat chain drive wheel and a slat chain driven wheel; a shaft of the slat chain drive wheel is driven by an output shaft of a slat chain drive motor through a one-way bearing; a tight side of the slat chain is attached to a bottom of the mesh chain transition section and moves forward in the same direction as the mesh chain transition section; the central part of each chain link of the slat chain is provided with an upwardly extending slat chain tooth; the slat chain tooth on the tight side is correspondingly embedded in a slot of the chain link of the mesh chain at the mesh chain transition section.

As a further improvement of the present disclosure, a swing rail is provided below the mesh chain transition section; the top surface of the swing rail is horizontal and supported at the bottom of the mesh chain; the central part of the top surface of the swing rail is provided with a swing rail sink extending along the forward direction of the mesh chain; the tight side of the slat chain is embedded in the swing rail sink; the swing rail sink includes a horizontal section and an inclined section that are in a smooth fit; the inclined section inclines downward along the forward direction of the tight side of the slat chain; the tight side of the slat chain nestles on the bottom of the swing rail sink and inclines downward to move forward; the slat chain drive wheel is located at an outlet of the inclined section; the pitch circle of the slat chain drive wheel is tangential to the bottom wall of the inclined section.

As a further improvement of the present disclosure, limiting slots are symmetrically arranged at the front and back sides of the bottom of the swing rail sink, such that the swing rail sink is provided with an inverted T-shaped cross-section; outwardly extending slat chain limiting flashes are symmetrically arranged on the front and back sides of the bottom of each chain link of the slat chain; the slat chain limiting flashes on the front and back sides of the tight side of the slat chain are symmetrically embedded in the limiting slots at the bottom of the swing rail sink. When the slat chain tooth engages with an end of the chain link of the mesh chain, the top of the slat chain tooth is higher than the upper edge of the chain pin of the mesh chain, and an engaging surface of the slat chain tooth protrudes in the forward direction. The pitch of the slat chain is less than the pitch of the mesh chain.

As a further improvement of the present disclosure, the mesh chain return section is provided with a mesh chain tensioner located between the two rotary drums; the mesh chain tensioner includes two fixed-shaft tensioning wheels; a floating tensioning wheel is provided between the two fixed-shaft tensioning wheels; a mesh chain tension section bypasses a right fixed-shaft tensioning wheel, the floating tensioning wheel, and a left fixed-shaft tensioning wheel in turn; a counterweight is suspended on a moving shaft of the floating tensioning wheel; left and right sides of the counterweight are provided with two centralizing guide rails that are symmetrical and parallel with each other; the two centralizing guide rails are provided with centralizing guide slots that extend vertically and are provided with opposite openings; left and right ends of the counterweight are respectively provided with two outwardly extending counterweight centralizing rods; outer ends of the two counterweight centralizing rods are respectively provided with two counterweight centralizing wheels; the two counterweight centralizing wheels are respectively located in the centralizing guide slots of the centralizing guide rails; two ends of the moving shaft of the floating tensioning wheel are respectively suspended with two traction springs that are symmetrical with each other; lower ends of the two traction springs are respectively hinged to the counterweight centralizing rods; the fixed-shaft tensioning wheel downstream of the floating tensioning wheel is a driving wheel fixed to a tensioning wheel drive shaft; an output end of a tensioner motor drives the tensioning wheel drive shaft through a one-way bearing; a traction force generated by the driving fixed-shaft tensioning wheel adapts to a weight of the counterweight and a sag of the mesh chain.

Compared with the prior art, the present disclosure has the following beneficial effects. 1. The driving pole on the outer circumference of the rotary drum is embedded in the arc slot of the drive head to play the role of engaged transmission and avoid the drive head slipping outward. When the rotary drum rotates, each driving pole drives the mesh chain to rotate synchronously. The spiral ring rail is embedded with the spacer strip to reduce the sliding resistance of the mesh chain of each layer in rotation.

2. In an implementation of the mesh chain entering the turning transition section from the straight travel section, since the limiting protrusion of each chain link slides against the outer arc surface of the arc-shaped limiting plate, the mesh chain is forced to turn and move along the limiting arc of the arc-shaped limiting plate. The travel path of the turning transition section is defined by the arc-shaped limiting plate, so the outer side of the mesh chain at the turning transition section forces the loose inner side of the mesh chain to adjust the position. After the inner side adapts to the perimeter of the outer side, the drive head on the inner side of the mesh chain is directly engaged with the driving pole. The driving pole can extend along a full height direction of the rotary drum without the need for a guide element at an inlet end of the driving pole.

3. An inlet end of the limiting arc deviates to an outer side of the rotary drum, such that the drive head at the inlet end is separated from the driving pole for a certain distance. The design prevents the drive head on the inner side of the mesh chain from contacting or engaging with the driving pole in advance and prevents the inner side of the mesh chain from being restricted during its position adjustment. An outlet end of the limiting arc intersects the circumference of the driving pole, such that when the position of the inner side of the mesh chain is adjusted in place, the drive head can smoothly engage with the driving pole.

4. When the mesh chain enters the turning transition section, the outer side of each chain link is tensioned and the inner side of each chain link is close to each other, such that the mesh chain is fan-shaped to achieve turning. During turning, one end of a first chain pin close to the outer side of the mesh chain is close to the front side wall of the first pin hole to provide tension for the chain link. One end of a second chain pin close to the outer side of the mesh chain is close to the back side wall of the second pin hole to provide tension for the next chain link.

The first pin holes of the multiple chain teeth on the outer side of the mesh chain each are provided with a forward inclined surface. The front inclined surface forms an angle of $\alpha$ with a front side wall of a straight hole to prevent an outer end of the first chain pin from contacting the forward inclined surface. During turning, a point of force of the first chain pin and the first pin hole is an intersection of the front inclined surface and the front side wall of the straight hole. That is, the point of force of the first chain pin and the first pin hole moves inward for a distance from an outermost chain tooth.

The second pin holes of the multiple chain teeth on the outer side of the mesh chain each are provided with a backward inclined surface. The backward inclined surface forms an angle of β with the back side wall of the straight hole to prevent an outer end of the second chain pin from contacting the backward inclined surface. When turning, a point of force of the second chain pin and the second pin hole is an intersection of the backward inclined surface and the back side wall of the straight hole. That is, the point of force of the second chain pin and the second pin hole moves inward for a distance from an outermost chain tooth.

Since the limiting protrusion on the outer side of the mesh chain is butted up against the outer arc surface of the arc-shaped limiting plate, it is located at a distance outside the intersection of the front inclined surface and the front side wall of the straight hole, and the point of force of the mesh chain is located at a distance inside the limiting protrusion. When the mesh chain turns, friction resistance from the limiting protrusion and traction from the point of force make the inner side of the mesh chain move further forward, and more drive heads enter the turning transition section. This makes it easy for the drive head adapting to the outer perimeter to smoothly engage with the driving pole, and the engaged mesh chain will not produce tension greater than that at the front section to better realize slack conveyance.

5. The resistance of the mesh chain turning along the arc-shaped limiting plate can be reduced by providing a limiting bearing, a limiting roller, or a limiting ball on the outer side of the mesh chain or providing a limiting roller or a limiting ball on the arc-shaped limiting plate.

6. In another implementation of the mesh chain entering the turning transition section, a guide element is provided at the inlet end of the vertical drum rod. Taking the ascending spiral as an example, the driving pole extends to the bottom of the circular-arc guide surface has the outer edge tangential to the circular-arc guide surface, and the driving pole is hidden in the circular-arc guide surface. In this way, the drive head can slide freely along the circular-arc guide surface, such that the outer side of the mesh chain can force the loose inner side of the mesh chain to adjust its position without the interference of the driving pole. After the inner side of the mesh chain fully adapts to the perimeter of the outer side, the drive head ascends with the mesh chain to the position of the inclined-arc guide surface and engages with the driving pole inserted on the inclined-arc guide surface. The inclined-arc guide surface provides an engaging space for two sides of the driving pole.

7. In another implementation of the mesh chain entering the turning transition section, a guide element is provided at the inlet end of the vertical drum rod. Take the descending spiral as an example, the upper end of each driving pole is spliced with the arc ridge of the floating element. The drive head can slide freely along the arc ridge, such that the outer side of the mesh chain can force the loose inner side of the mesh chain to adjust its position without the interference of the driving pole. When the inner side of the mesh chain fully adapts to the perimeter of the outer side, the drive head descends with the mesh chain to the upper end of the driving pole for engagement.

Two sides of the floating element are mated with the vertical slot of the vertical drum rod, and the vertical projection is mated with the floating slot. In this way, the floating element can move along the diameter direction of the rotary drum. The floating spring provides the floating element with an outward elastic force to compensate for an error of a turning radius of the mesh chain and maintain a certain tension in the mesh chain transition section. Especially for a double-tower structure, the mesh chain at the outlet of the left rotary drum can be rotated out normally without limiting ping. The elasticity of the floating element can compensate for the error of the rotating out and rotating in of the mesh chain between the two towers, such that the inner side of the mesh chain can keep fitted to the arc ridge of the floating element. The force received by the curved ridge falls back on the vertical drum rod. The mesh chain continues to rotate to smoothly transition to and engage with the driving pole below.

8. The oblique engaging surface at a lower part of the engaging end engages with a trapezoidal tooth of the main drive sprocket. The design can bear a relatively large load, realize reliable transmission, prevent slippage, and is applicable on a heavy-load traction conveyor in other scenarios.

9. Each chain link of the transmission chain can also be provided with two chain pins and two engaging surfaces. The tooth of the drum sprocket engages with the roller on the second chain pin. The trapezoidal tooth of the main drive sprocket engages with the oblique engaging surface at the lower part of the engaging end. The design improves the bearing capacity and prolongs the service life of the transmission chain. The outer chain plates and the inner chain plates can be prepared separately or integrally.

10. The mesh chain is very long. The mesh chain tensioner can properly tension the mesh chain to create a pre-tensioning force to reduce the sag of the mesh chain and compensate for the length change of the mesh chain caused by the tension or thermal expansion and contraction. The left and right ends of the counterweight each are embedded in a centralizing guide slot of centralizing guide rail through the counterweight centralizing wheel. This can prevent the counterweight from shaking back and forth during lifting, and reduce the resistance of the counterweight during lifting. When the tension of the mesh chain return section is too small, the counterweight moves downward and stores more chain links of the mesh chain. On the contrary, the counterweight moves upward.

11. The shaft of the floating tensioning wheel is flexibly connected with the counterweight centralizing rod through the traction spring to reduce the impact load during tensioning floating and avoid excessive fluctuation of the mesh chain. The output end of the tensioner motor drives the tensioning wheel drive shaft through the one-way bearing. When the traveling speed of the mesh chain is greater than the speed of the driving tensioning wheel, the one-way bearing slips to avoid interference. The speed of the tensioner motor depends on the sag of the mesh chain and the weight of the counterweight. An ideal state is to balance 90-100% of the weight of the counterweight to avoid the weight of the counterweight bringing the additional load to the mesh chain and affecting the slack conveyance of the mesh chain. The sag of the mesh chain is controlled within a set range.

12. The slat chain is provided in the mesh chain transition section between the two spiral towers. According to the width of the mesh chain, there may be one slat chain or may be two slat chains arranged symmetrically. The slat chain drive motor drives the slat chain drive wheel through a one-way bearing. The slat chain drive motor can be a torque-controlled motor, and the one-way bearing can be driven to ensure that the slat chain compensates for the driving force of the mesh chain transition section without interference. The slat chain drive wheel drives the slat chain and the mesh chain transition section to travel forward in the same direction. The slat chain tooth on the slat chain engages with the corresponding chain link of the mesh chain transition section to apply an auxiliary driving force to the mesh chain transition section to compensate for a synchronization error between the two towers.

13. The swing rail can support the weight of the mesh chain transition section to avoid its sagging. The swing rail sink provides space for the slat chain. The slat chain tooth engages with the mesh chain at the horizontal section to generate a driving force. At this time, the front slat chain tooth enters the inclined section, gradually sinks and leaves the slot of the mesh chain. The slat chain tooth that travels to the end of the inclined section is completely separated from the mesh chain and enters the arc section of the slat chain drive wheel. When the slat chain enters the arc section, a distance between the tops of each two adjacent slat chain teeth is obviously greater than the distance between bottoms thereof. If the slat chain tooth is still engaged at this time, interference will occur. In the present disclosure, the horizontal section and the inclined section are arranged in front of the slat chain drive wheel. When the slat chain passes through a junction of the horizontal section and the inclined section, the change in the distance between the top of each two adjacent slat chain teeth is much smaller than the change of the arc section. The design ensures the engagement drive of the slat chain tooth at the horizontal section and ensures that the driven slat chain tooth can be smoothly disengaged.

14. The slat chain limiting flashes at the front and back sides of the slat chain are embedded in the limiting slots of the swing rail. Thus, the slat chain is restricted to the bottom of the swing rail sink to avoid jumping. Meanwhile, when the slat chain moves forward along the bottom of the inclined section, the slat chain tooth is forced to disengage from the slot of the mesh chain transition section to avoid jamming.

15. The top of the slat chain tooth is higher than the chain pin of the mesh chain, and the engaging surface protrudes in the forward direction. Through the design, it is easy to apply a component force to the top surface of the swing rail while applying forward power to the mesh chain, such that the mesh chain is stably supported on the swing rail to avoid jumping. In operation, it is still satisfactory when only one slat chain tooth can effectively drive the mesh chain. The pitch of the slat chain is smaller than that of the mesh chain. For example, the pitch of the slat chain is 1 mm smaller than the pitch of the mesh chain. When multiple pitches are moved, there is a certain clearance between the engaging surfaces of the previous section. When the slat chain tooth at the horizontal section is in an engaging drive state, the slat chain tooth entering the inclined section can smoothly disengage from the slot of the mesh chain, further reducing the possibility of interference.

BRIEF DESCRIPTION OF THE DRAWINGS

The present disclosure is described in further detail below by referring to the drawings and specific implementations. The drawings are provided for reference and illustration only and are not intended to limit the present disclosure.

Figure 1:
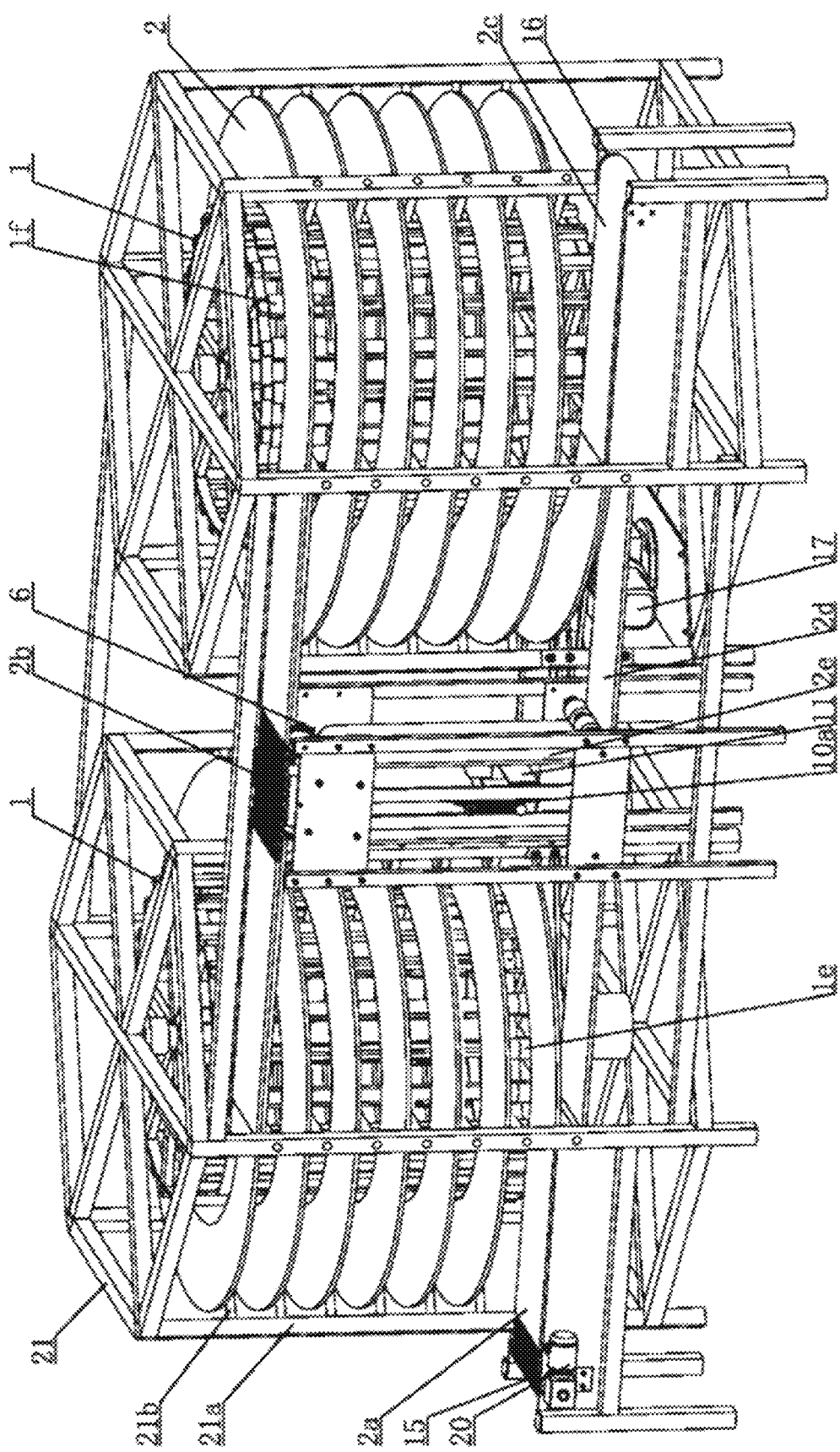
FIG. 1 is a stereoscopic view of a spiral conveyor according to the present disclosure.
Figure 2:
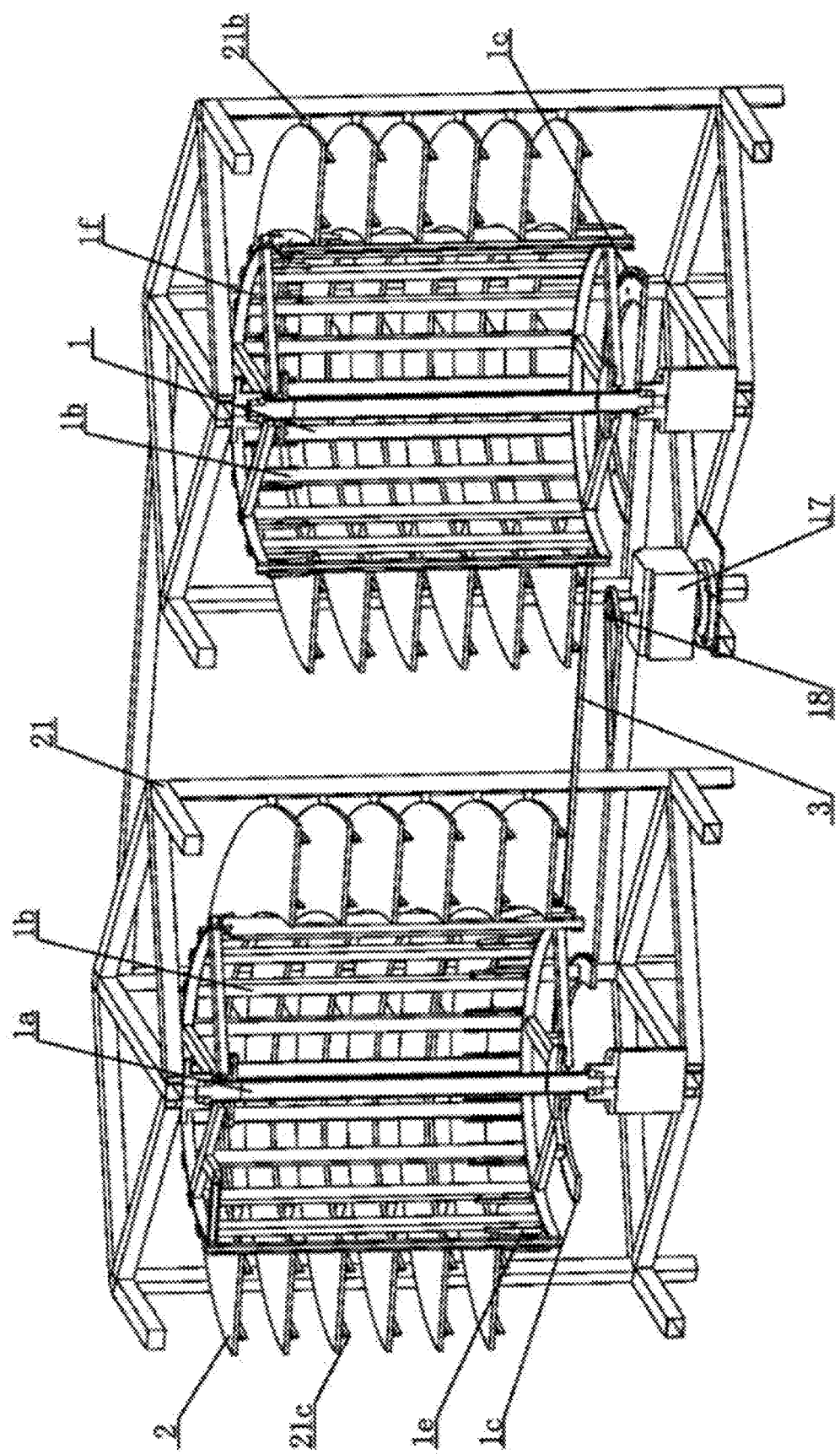
FIG. 2 is a section view of the spiral conveyor according to the present disclosure.
Figure 3:
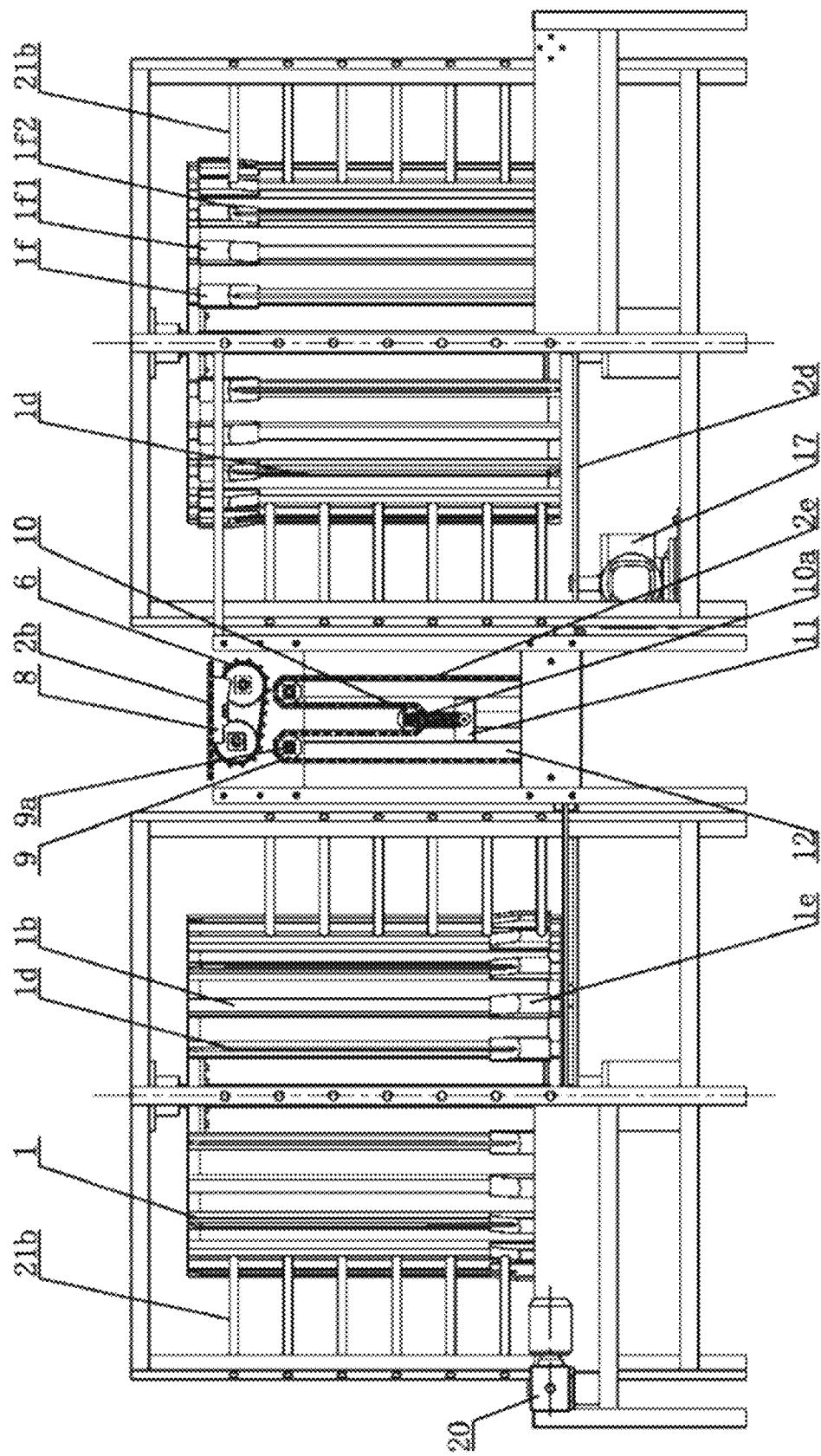
FIG. 3 is a front view of the spiral conveyor according to the present disclosure.
Figure 4:
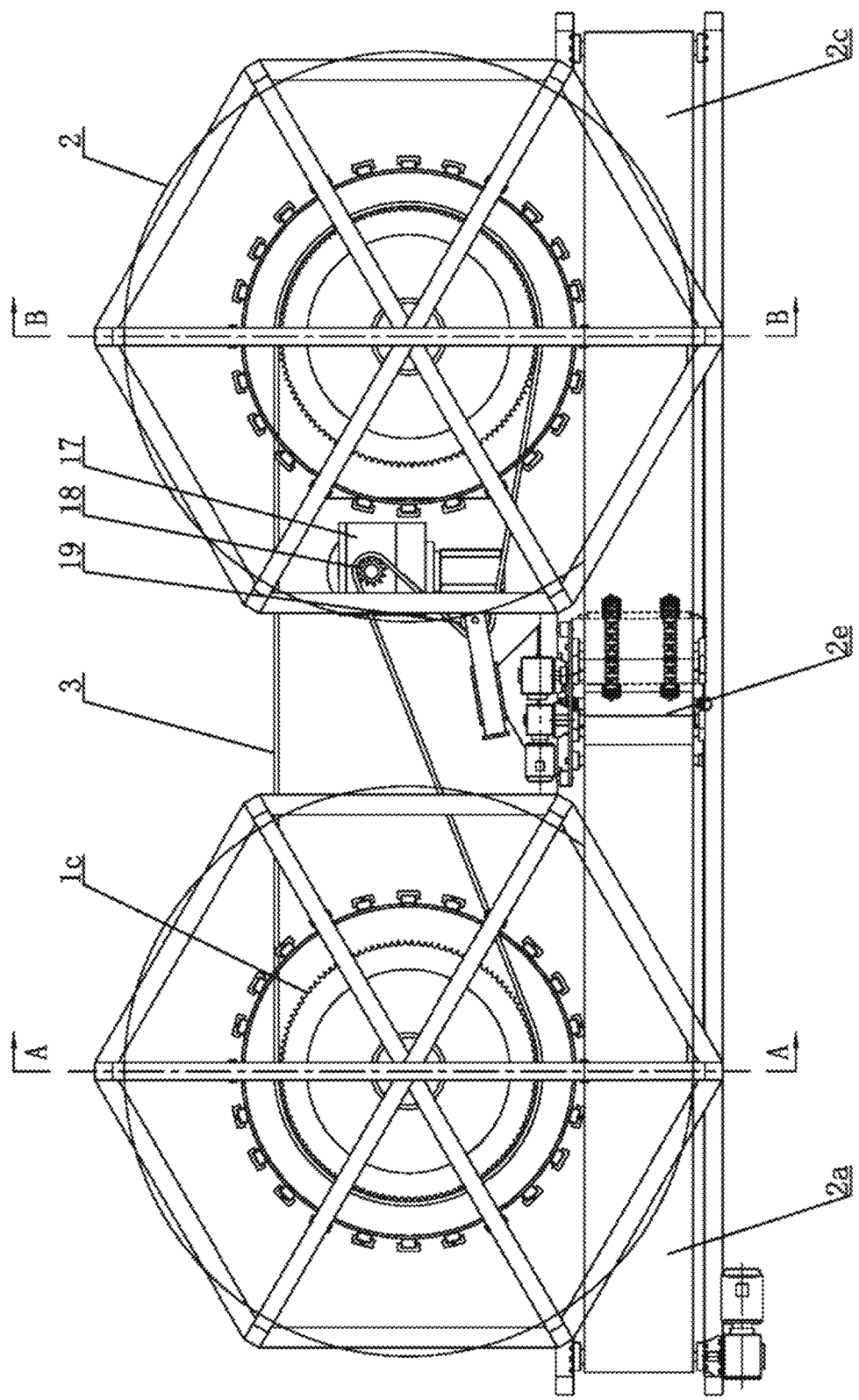
FIG. 4 is a top view of the spiral conveyor shown in FIG. 3.

REFERENCE NUMERALS 1. rotary drum; 1$a$. central shaft; 1$b$. vertical drum rod; 1$b$1. vertical slot; 1$b$2. vertical projection; 1$c$. drum sprocket; 1$d$. driving pole; 1$e$. left drum guide element; 1$f$. right drum guide element; 1/1. circular-arc guide surface; 1/2. inclined-arc guide surface; 1$g$. floating element; 1$g$1. arc ridge; 1$g$2. floating slot; and 1$g$3. floating spring;

2. mesh chain; 2$a$. mesh chain input section; 2$b$. mesh chain transition section; 2$c$. mesh chain output section; 2$d$. mesh chain return section; 2$e$. mesh chain tension section; 2$f$. drive head; 2$g$. limiting protrusion; 2$h$. first pin hole; 2$j$. second pin hole; 2$k$. chain lug; 2$m$. limiting ball; and 2$n$. limiting bearing; and 3. transmission chain; 3$a$. outer chain plate; 3$b$. inner joint; 3$b$1. engaging end; 3$b$2. oblique engaging surface; 3b3. inner chain plate; 3c. roller; 3d. first chain pin; 3e. second chain pin; 4. slat chain drive motor; 5. slat chain drive wheel; 6. slat chain; 6a. slat chain tooth; 6b. slat chain limiting flash; 7. slat chain driven wheel; 8. swing rail; 8a. swing rail sink; 8a1. horizontal section; 8a2. inclined section; 8a3. limiting slot; 9. fixed-shaft tensioning wheel; 9a. tensioning wheel drive shaft; 10. floating tensioning wheel; 10a. traction spring; 11. counterweight; 11a. counterweight centralizing rod; 11b. counterweight centralizing wheel; 12. centralizing guide rail; 13. tensioner motor; 14. one-way bearing; 15. left steering wheel; 16. right steering wheel; 17. main drive motor reducer; 18. main drive sprocket; 18a. trapezoidal tooth; 19. tensioning sprocket; 20. auxiliary motor; 21. frame; 21a. vertical post; 21b. radial support rod; 21c. spiral ring rail; 21d. spacer strip; 22. arc-shaped limiting plate; 23. inner sprocket; and 24. outer sprocket.

DETAILED DESCRIPTION OF THE EMBODIMENTS

In the description of the present disclosure, the terms such as "front", "back", "left", "right", "inner" and "outer" are intended to indicate orientations or positions based on the drawings. It should be noted that these terms are merely intended to facilitate and simplify the description of the present disclosure, rather than to indicate or imply that the mentioned device must have a specific orientation. The spiral conveyor can be provided as a mirror image of the drawings shown in the figures.

As shown in FIGS. 1 to 7, the present disclosure provides a spiral conveyor, including rotary drums 1. Mesh chain 2 is spirally wound around (e.g., along) the outer circumference of each of the rotary drums 1 and rotates synchronously with each of the rotary drums 1. The inner side of each chain link of the mesh chain 2 close to the rotary drum 1 is provided with drive head 2f extending towards the drum body of the rotary drum. The edge of the drive head 2f forms a convex arc. The drive head 2f includes two sides or one side provided with an arc slot coinciding (e.g., matching in shape) with driving pole 1d. Driving poles 1d are evenly distributed around the circumference of the rotary drum 1 and are engaged with the drive heads 2f of each layer. The driving pole 1d is embedded in the arc slot of the drive head 2f to play a role of engaged transmission and avoid the drive head 2f slipping outward. The bottom of the mesh chain 2 of each layer is supported on spiral ring rail 21c to allow sliding of the mesh chain 2. The spiral ring rail 21c is embedded with spacer strip 21d to reduce the sliding resistance of the mesh chain 2 of each layer in rotation. Each layer of the spiral ring rail 21c is fixed to radial support rods 21b. Each radial support rod 21b has an outer end fixed to vertical post 21a. The vertical posts 21a are evenly distributed around an axis of the rotary drum. When the rotary drum 1 rotates, each driving pole 1d drives the mesh chain 2 to rotate synchronously.

The mesh chain 2 enters an arc spiral section from the straight travel section through the turning transition section. Chain pins at the straight travel section are parallel with each other, and chain pins at the arc spiral section are distributed in a fan shape. The outer side of the mesh chain at the turning transition section forces a loose inner side of the mesh chain to adjust its position. When the inner side adapts to the perimeter of the outer side, the drive head 2f on the inner side of the mesh chain engages with the driving pole 1d.

Multiple vertical drum rods 1b are evenly arranged along the circumference of the rotary drum 1. Each driving pole 1d is fixed to an outer vertical surface of the vertical drum rod 1b.

Figure 8:
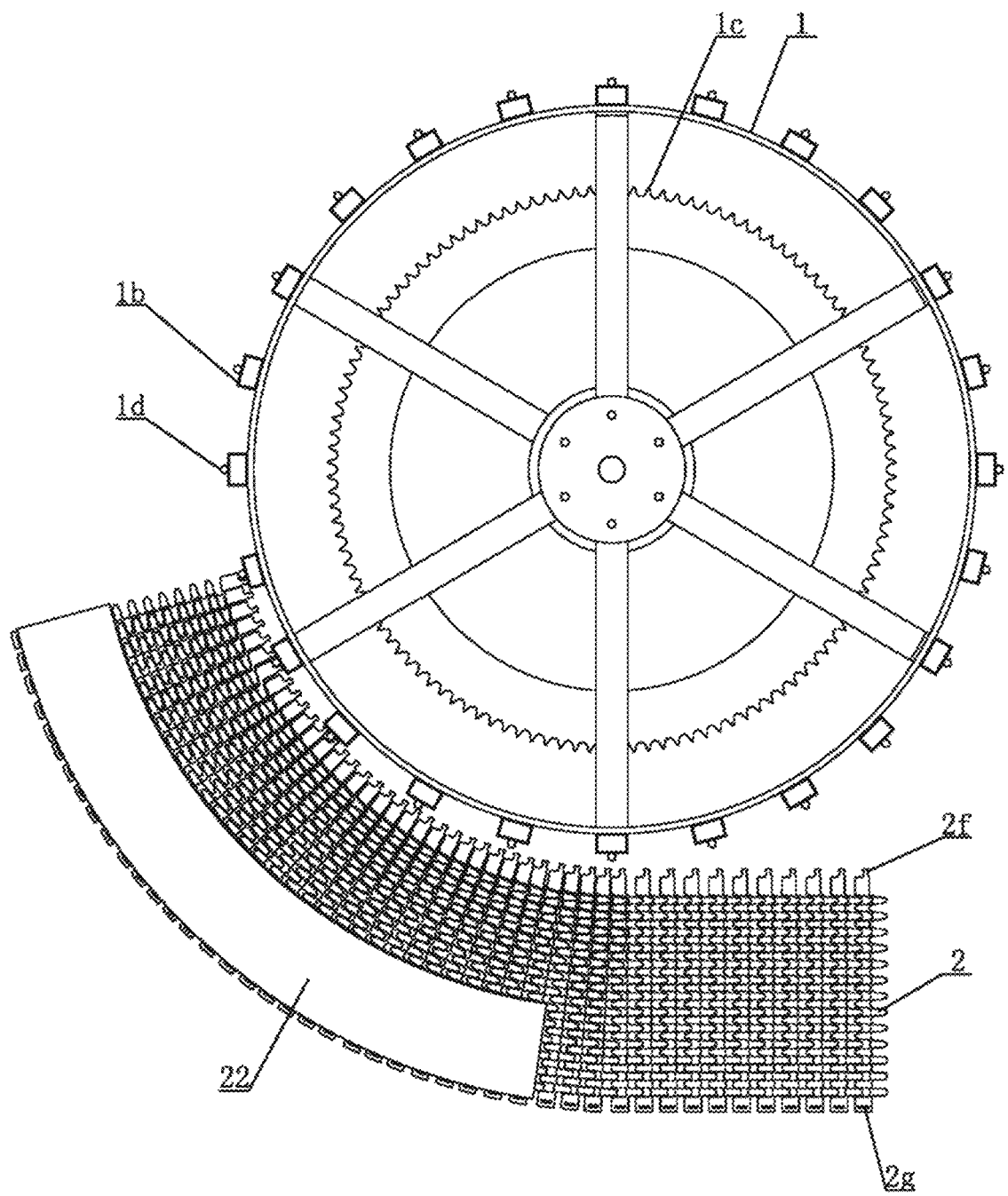
FIG. 8 is a bottom view showing a mesh chain engaging with a driving pole directly after passing a turning transition section.
Figure 9:
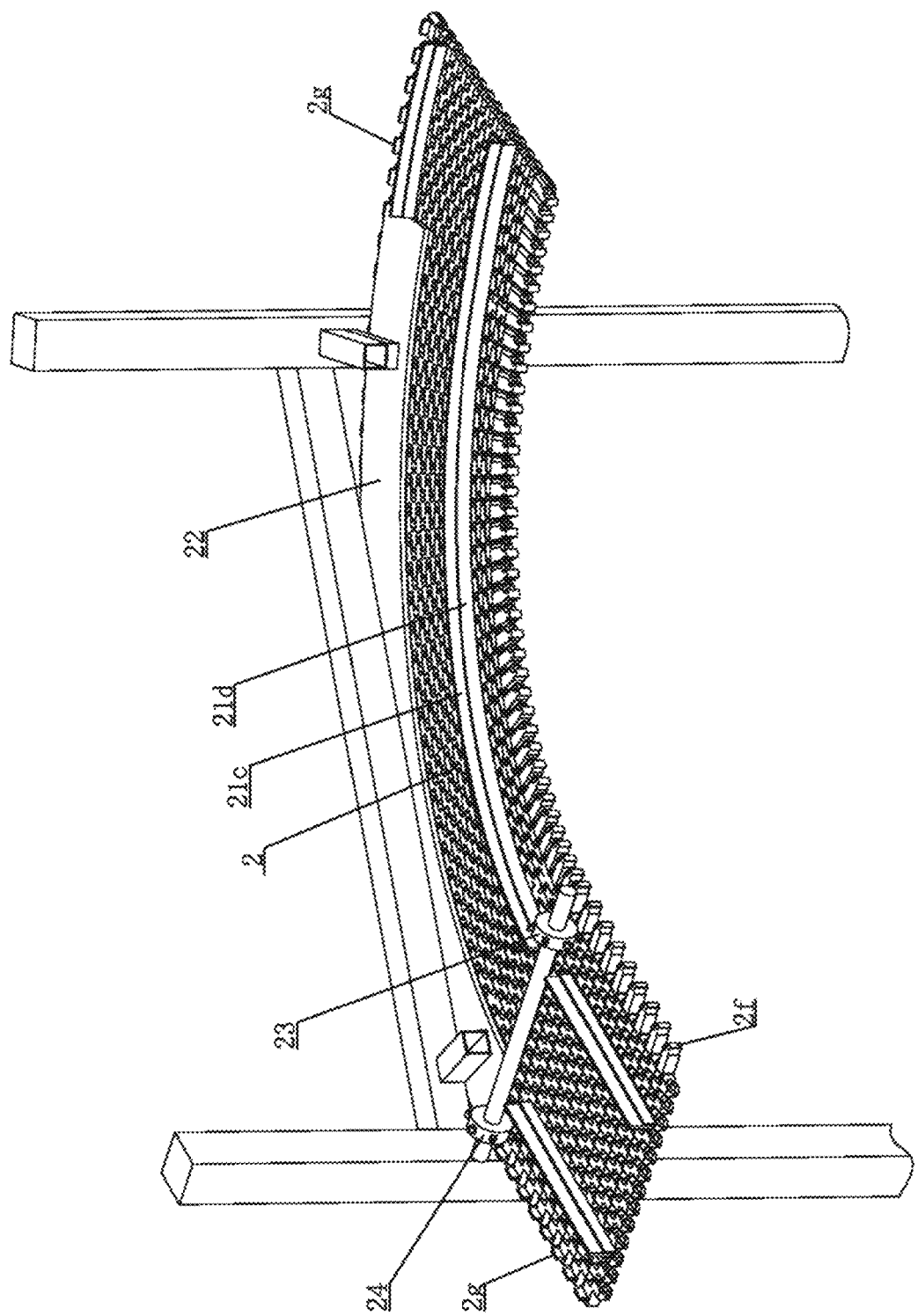
FIG. 9 is a bottom view of an arc-shaped limiting plate in the turning transition section.

FIGS. 8 and 9 show an implementation of the mesh chain 2 entering the turning transition section from the straight travel section. Arc-shaped limiting plate 22 is provided below the turning transition section. The mesh chain 2 turns and moves forward along a limiting arc of the arc-shaped limiting plate 22, and the surface of the limiting arc can be strengthened through hardening.

The outer side of each chain link of the mesh chain 2 is provided with downwardly extending limiting protrusion 2g. Each limiting protrusion 2g slides against an outer arc surface of the arc-shaped limiting plate 22. Since the limiting protrusion 2g of each chain link slides against the outer arc surface of the arc-shaped limiting plate 22, the mesh chain 2 is forced to turn and move along the limiting arc of the arc-shaped limiting plate 22. The travel path of the turning transition section is defined by the arc-shaped limiting plate 22, so the outer side of the mesh chain at the turning transition section forces the loose inner side of the mesh chain to adjust its position. After the inner side of the mesh chain adapts to the perimeter of the outer side of the mesh chain, the drive head 2f on the inner side of the mesh chain is directly engaged with the driving pole 1d. The driving pole 1d can extend along a full height direction of the rotary drum 1 without the need for a guide element at an inlet end of the driving pole 1d.

As shown in FIG. 8, the radius of the limiting arc is equal to or less than the distance between a head end of the limiting arc and the axis of the rotary drum. An axis of the limiting arc deviates from the axis of the rotary drum, such that the distance between a tail end of the limiting arc and the axis of the rotary drum is less than the distance between the head end of the limiting arc and the axis of the rotary drum. An inlet end of the limiting arc deviates to an outer side of the rotary drum, such that the drive head 2f at the inlet end is separated from the driving pole 1d for a certain distance. The design prevents the drive head 2f on the inner side of the mesh chain from contacting or engaging with the driving pole 1d in advance and prevents the inner side of the mesh chain from being restricted during the position adjustment of the mesh chain. An outlet end of the limiting arc intersects a circumference of the driving pole 1d, such that when the position of the inner side of the mesh chain is adjusted into place, the drive head 2f can smoothly engage with the driving pole 1d.

Figure 10:
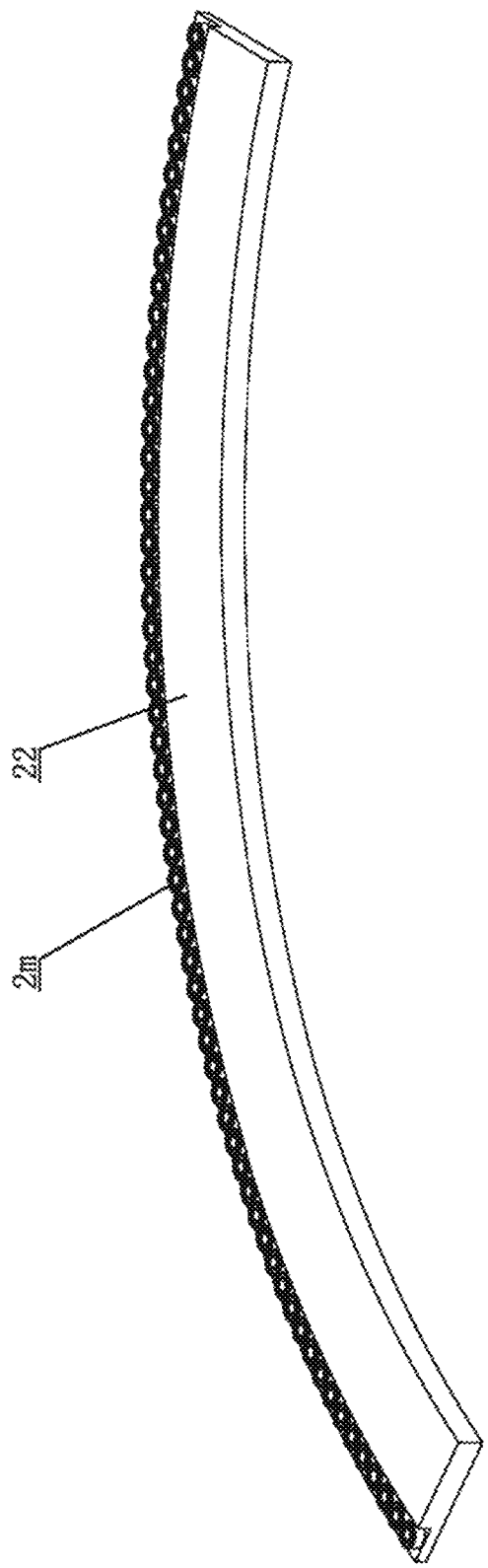
FIG. 10 is a schematic diagram showing a limiting ball of the arc-shaped limiting plate.

The resistance of the mesh chain 2 turning along the arc-shaped limiting plate 22 can be reduced in a variety of ways. As shown in FIG. 9, the outer side of each chain link of the mesh chain 2 is provided with the downwardly extending limiting protrusion 2g. As shown in FIG. 10, the bottom of the outer arc surface of the arc-shaped limiting plate 22 is provided with an outwardly extending limiting flash. Multiple limiting rollers or limiting balls 2m are fixed to the limiting flash. Each limiting protrusion 2g slides against the limiting roller or limiting ball 2m.

Figure 11:
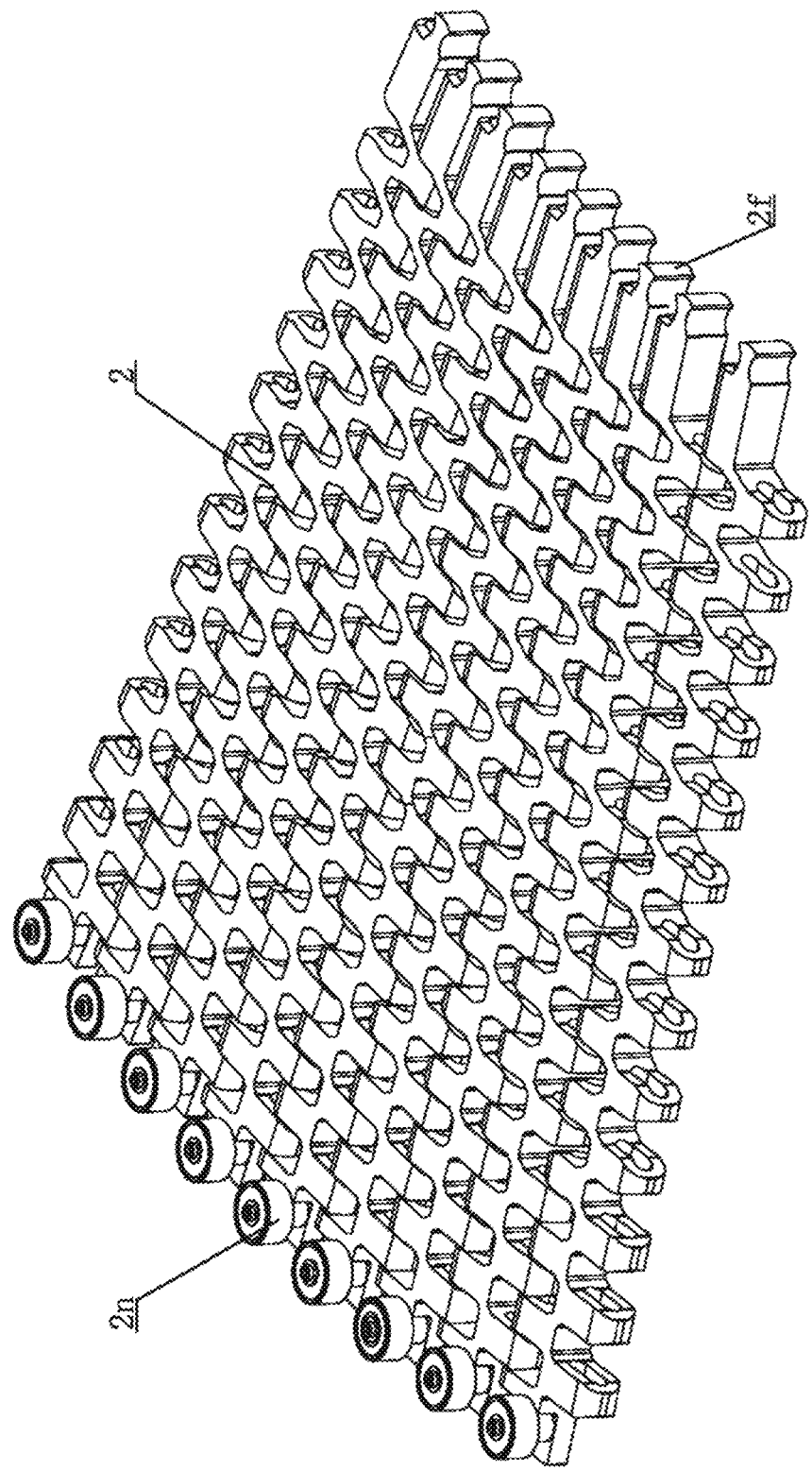
FIG. 11 is a schematic diagram showing a limiting bearing of the mesh chain.

As shown in FIG. 11, the outer side of each chain link of the mesh chain 2 is provided with a downwardly extending limiting shaft. Limiting bearing 2n is provided on each limiting shaft. Each limiting bearing 2n slides against the outer arc surface of the arc-shaped limiting plate 22.

Figure 12:
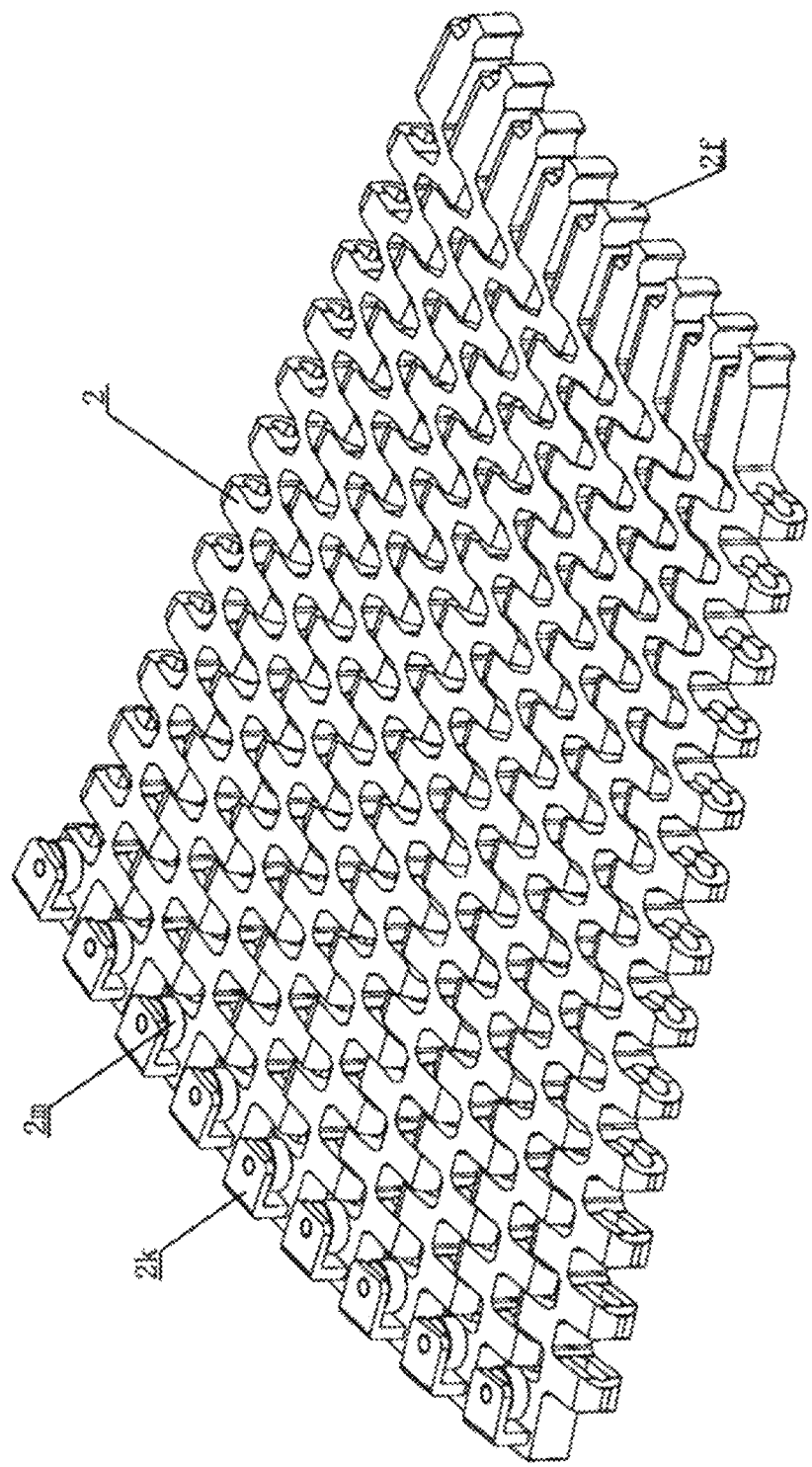
FIG. 12 is a schematic diagram showing a limiting ball of the mesh chain.

As shown in FIG. 12, the outer side of each chain link of the mesh chain 2 is provided with downwardly extending chain lug 2k. A free end of each lug 2k is provided with the limiting roller or limiting ball 2m. Each limiting roller or limiting ball slides against the outer arc surface of the arc-shaped limiting plate 22.

Figure 13:
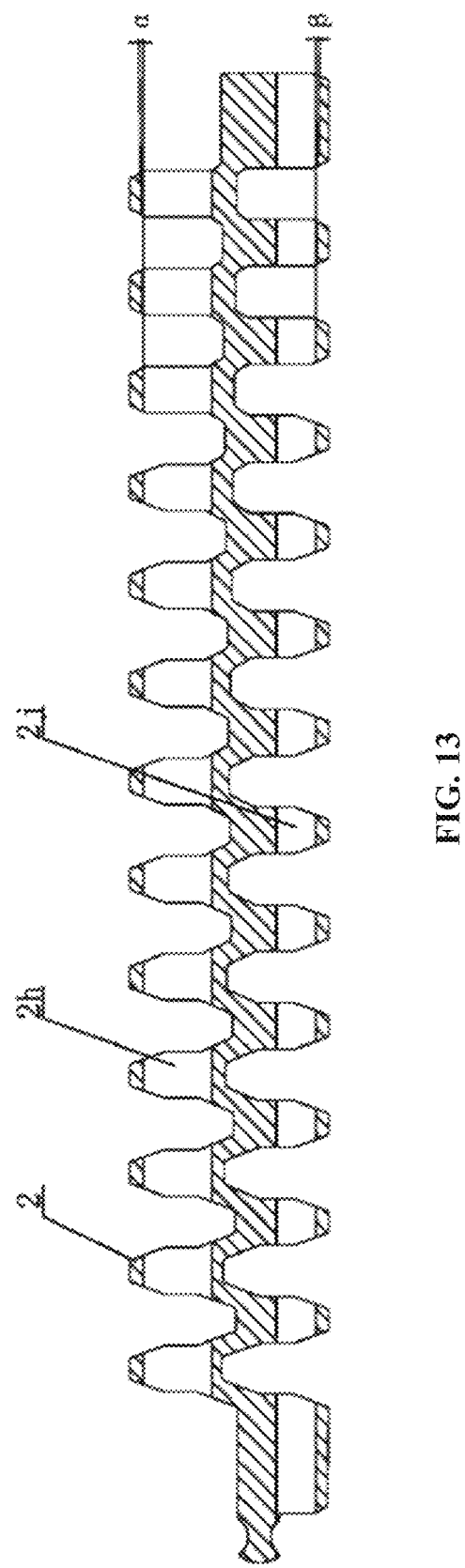
FIG. 13 is a section view of a chain link of the mesh chain.

As shown in FIG. 13, each chain link of the mesh chain 2 is provided with first pin hole 2h and second pin hole 2j, each of which runs along the width direction of the mesh chain. Cross sections of the first pin hole 2h and the second pin hole 2j are oval-shaped extending along a forward direction of the mesh chain. Front side walls of first pin holes 2h of multiple chain teeth on the outer side of the mesh chain incline forward along a slope, and back side walls of second pin holes 2j of the multiple chain teeth on the outer side of the mesh chain incline backward along another slope.

When the mesh chain 2 enters the turning transition section, the outer side of each chain link is tensioned and the inner side of each chain link is close to each other, such that the mesh chain 2 is fan-shaped to achieve turning. When turning, one end of a first chain pin close to the outer side of the mesh chain is close to the front side wall of the first pin hole 2h to provide tension for the chain link. One end of a second chain pin close to the outer side of the mesh chain is close to the back side wall of the second pin hole 2j to provide tension for the next chain link.

The first pin holes 2h of the multiple chain teeth on the outer side of the mesh chain each are provided with a forward inclined surface. The front inclined surface forms an angle of α with a front side wall of a straight hole to prevent an outer end of the first chain pin from contacting the forward inclined surface. When turning, a point of force of the first chain pin and the first pin hole 2h is the intersection of the front inclined surface and the front side wall of the straight hole. That is, the point of force of the first chain pin and the first pin hole 2h moves inward for a distance from an outermost chain tooth.

The second pin holes 2j of the multiple chain teeth on the outer side of the mesh chain each are provided with a backward inclined surface. The backward inclined surface forms an angle of β with the back side wall of the straight hole to prevent an outer end of the second chain pin from contacting the backward inclined surface. When turning, a point of force of the second chain pin and the second pin hole 2j is the intersection of the backward inclined surface and the back side wall of the straight hole. That is, the point of force of the second chain pin and the second pin hole 2j moves inward for a distance from an outermost chain tooth.

Since the limiting protrusion 2g on the outer side of the mesh chain is butted up against the outer arc surface of the arc-shaped limiting plate 22, it is located at a distance outside the intersection of the front inclined surface and the front side wall of the straight hole, and the point of force of the mesh chain is located at a distance inside the limiting protrusion 2g. When the mesh chain turns, the friction resistance from the limiting protrusion 2g and traction from the point of force make the inner side of the mesh chain move further forward and more drive heads 2f enter the turning transition section. This makes it easy for the drive head 2f adapting to the outer perimeter to smoothly engage with the driving pole 1d, and the engaged mesh chain will not produce tension greater than that at the front section to better realize slack conveyance.

Figure 14:
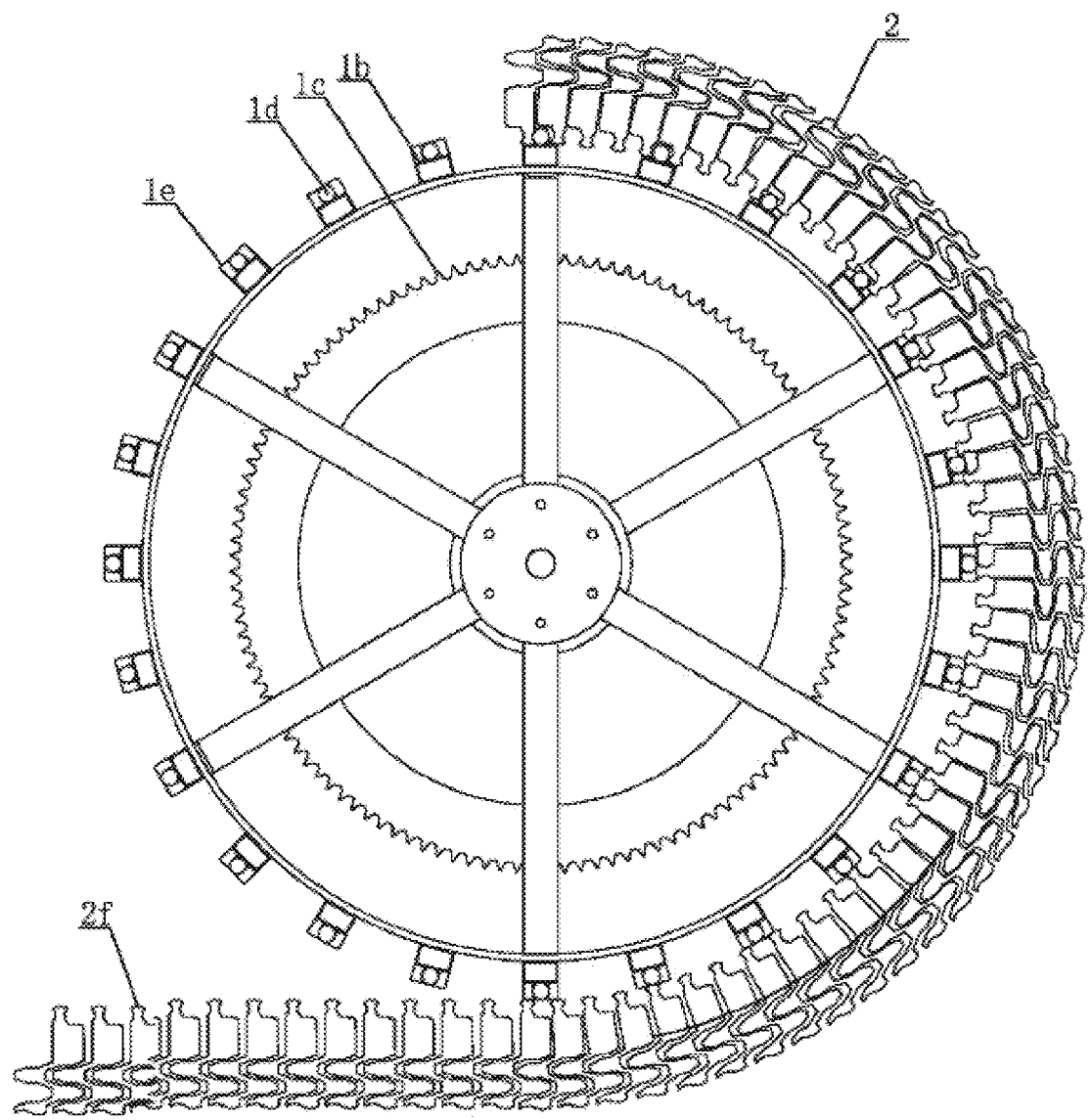
FIG. 14 is a schematic diagram showing that the mesh chain with a guide element engages with the driving pole when passing the turning transition section.
Figure 15:
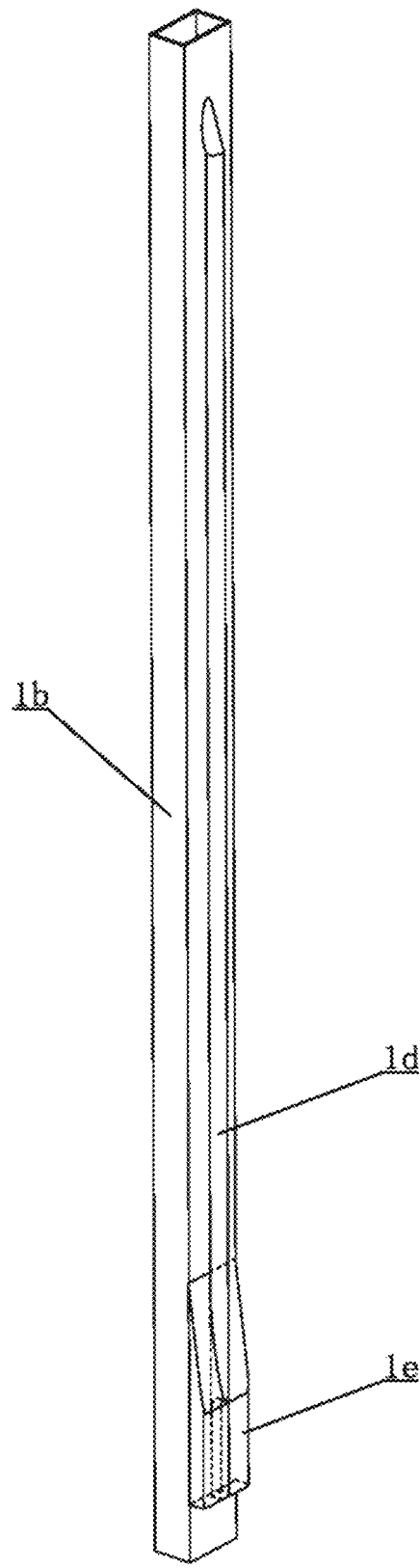
FIG. 15 is a stereoscopic view showing that a lower end of the driving pole is inserted from an inclined-arc guide surface and extends into a bottom of a circular-arc guide surface.

FIGS. 14 and 15 show another implementation of the mesh chain entering the turning transition section. One end of each vertical drum rod 1b is fixed with a guide element. The guide element is located at the bottom of the rotary drum during an ascending spiral or at the top of the rotary drum during a descending spiral. Each guide element is provided with a circular-arc guide surface and an inclined-arc guide surface in a smooth fit. The circular-arc guide surface is coaxial with the rotary drum and has a radius equal to or less than the radius of the rotary drum. The circular-arc guide surface in the ascending spiral is downward, and the circular-arc guide surface in the descending spiral is upward. Each driving pole 1d in the ascending spiral is inserted from a central part of the inclined-arc guide surface in a width direction and extends to the bottom of the circular-arc guide surface. Each driving pole 1d in the descending spiral is inserted from a central part of the inclined-arc guide surface in a width direction and extends to the top of the circular-arc guide surface. The outer edge of each driving pole 1d is tangential to the circular-arc guide surface. The outer side of the mesh chain at the turning transition section forces the loose inner side of the mesh chain to adjust its position. The inner side of the mesh chain slides along the circular-arc guide surface of the guide element until the inner side of the mesh chain adapts to (e.g., contacts) the perimeter of the outer side of the mesh chain, such that the drive head 2f on the inner side of the mesh chain engages with the driving pole 1d.

A guide element is provided at the inlet end of the vertical drum rod 1b. Taking the ascending spiral as an example, the driving pole 1d extends to the bottom of the circular-arc guide surface, the outer edge of which is tangential to the circular-arc guide surface, and the driving pole is hidden in the circular-arc guide surface. In this way, the drive head 2f can slide freely along the circular-arc guide surface, such that the outer side of the mesh chain can force the loose inner side of the mesh chain to adjust its position without the interference of the driving pole. After the inner side of the mesh chain fully adapts to the perimeter of the outer side, the drive head 2f ascends with the mesh chain to the position of the inclined-arc guide surface and engages with the driving pole 1d inserted on the inclined-arc guide surface. The inclined-arc guide surface provides an engaging space for two sides of the driving pole 1d.

Figure 16:
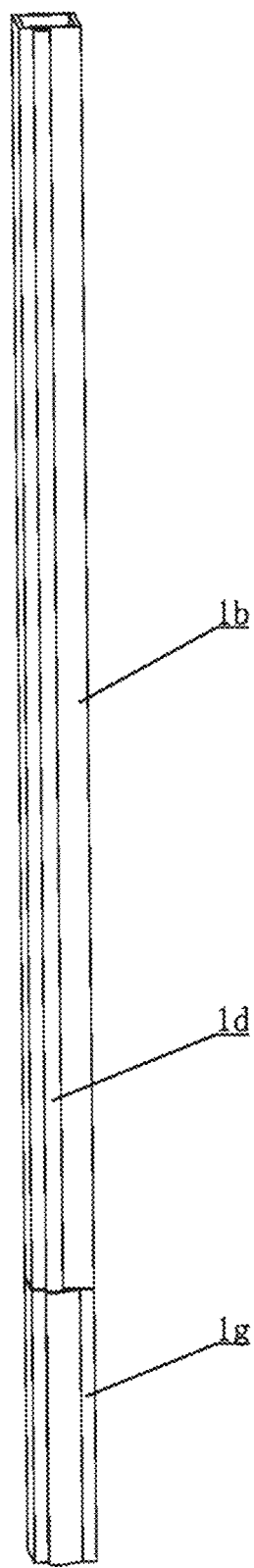
FIG. 16 is a stereoscopic view showing that the lower end of the driving pole is provided with a floating element.
Figure 17:
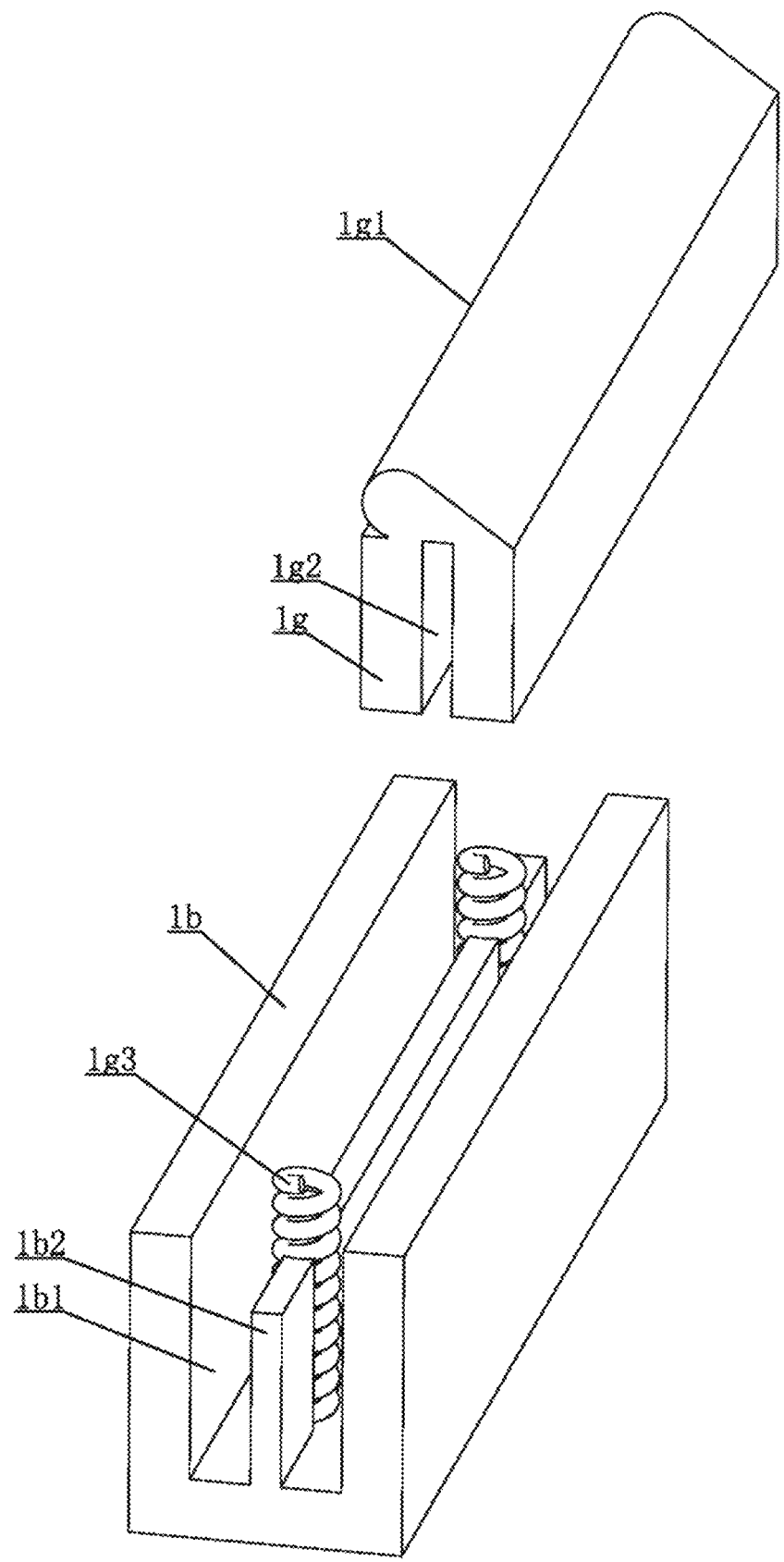
FIG. 17 is an exploded view showing the floating element and a vertical drum rod.

FIGS. 16 and 17 show another implementation of the mesh chain 2 entering the turning transition section. One end of each vertical drum rod 1b is fixed with floating element 1g. The floating element 1g is located at the bottom of the rotary drum of the ascending spiral or the top of the rotary drum of the descending spiral. The floating element 1g is provided with arc ridge 1g1. The arc ridge 1g1 inclines in the forward direction of the mesh chain 2. The lower end of each driving pole 1d of the ascending spiral is spliced with (e.g., engaged with, connected to, joined by) the arc ridge 1g1, and the upper end of each driving pole 1d of the descending spiral is spliced with the arc ridge 1g1. The outer edge of each arc ridge 1g1 is flush with the outer edge of the driving pole 1d, or the outer edge of each arc ridge 1g1 is higher than the outer edge of the driving pole 1d. The outer side of the mesh chain at the turning transition section forces the loose inner side of the mesh chain to adjust its position. The inner side of the mesh chain slides along the arc ridge 1g1 of the floating element 1g until the inner side of the mesh chain adapts to (e.g., contacts, matches the contour of) the perimeter of the outer side of the mesh chain, such that the drive head 2f on the inner side of the mesh chain engages with the driving pole 1d.

Take the descending spiral as an example, the upper end of each driving pole 1d is spliced with the arc ridge 1g1 of the floating element 1g. The drive head 2f can slide freely along the arc ridge 1g1, such that the outer side of the mesh chain can force the loose inner side of the mesh chain to adjust its position without the interference of the driving pole. When the inner side of the mesh chain fully adapts to the perimeter of the outer side, the drive head 2f descends with the mesh chain 2 to the upper end of the driving pole 1d for engagement.

The back surface of the floating element 1g is embedded in vertical slot 1b1 of the vertical drum rod 1b. The central part of the vertical slot 1b1 along the width direction is provided with vertical projection 1b2. The vertical projection 1b2 is embedded in floating slot 1g2 on the back surface of the floating element 1g. One end of floating spring 1g3 is embedded in the vertical projection 1b2. The other end of the floating spring 1g3 is embedded in a counterbore of the floating element 1g. Two sides of the floating element 1g are mated with the vertical slot 1b1 of the vertical drum rod 1b, and the vertical projection 1b2 is mated with the floating slot 1g2. In this way, the floating element 1g can be positioned along the diameter direction of the rotary drum. The floating spring 1g3 provides the floating element 1g with an outward elastic force to compensate for an error in the turning radius of the mesh chain and maintain a certain tension in the mesh chain transition section. Especially for a double-tower structure, the mesh chain at the outlet of the left rotary drum can be rotated out normally without limiting ping. The elasticity of the floating element 1g can compensate for the error of the rotating out and rotating in of the mesh chain between the two towers, such that the inner side of the mesh chain can continue to fit with the arc ridge 1g1 of the floating element 1g. The force received by the curved ridge 1g1 falls back on the vertical drum rod 1b. The mesh chain 2 continues to rotate to smoothly transition to and engage with the driving pole 1d below.

As shown in FIG. 9, an inlet of the turning transition section can be provided with inner sprocket 23 and outer sprocket 24. The inner sprocket 23 engages with the inner side of the chain link of the mesh chain 2. The outer sprocket 24 engages with the outer side of the chain link of the mesh chain 2. The inner sprocket 23 has the same speed as the outer sprocket 24 and can be pulled by a torque motor. The pitch diameter of the outer sprocket 24 is larger than the pitch diameter of the inner sprocket 23.

As shown in FIGS. 1 to 7, there are two rotating drums 1 arranged side by side. The lower end of each driving pole 1d of the left rotary drum is provided with left drum guide element 1e, and the upper end of each driving pole 1d of the right rotary drum is provided with right drum guide element 1f. Mesh chain input section 2a of the mesh chain 2 extends to the right and is tangential to the outer circumference of the left drum guide element 1e at the lower part of the left rotary drum. It spirals up along the outer circumference of the left rotary drum and tangentially moves to the right to enter mesh chain transition section 2b from an upper part of the left rotary drum. The mesh chain transition section 2b tangentially moves to the right to enter the outer circumference of the right drum guide element 1f at the upper part of the right rotary drum, spirals down along the outer circumference of the right rotary drum, and tangentially moves to the right to enter mesh chain output section 2c from the lower part of the right rotary drum. The mesh chain output section 2c moves to the left to enter mesh chain return section 2d after passing right steering wheel 16. The left end of the mesh chain return section 2d bypasses left steering wheel 15 and is connected with mesh chain input section 2a.

After the mesh chain input section 2a is led out from the left steering wheel 15, it tangentially moves into the circular-arc guide surface of the left drum guide element 1e and then spirals up obliquely to enter the inclined-arc guide surface of the left drum guide element 1e. The driving poles 1d evenly distributed along the circumference of the left rotary drum hook the drive heads 2f of the mesh chain 2 close to the inner side of the rotary drum. The mesh chain 2 is driven to move up around a rotary table of the rotary drum to the top of the left rotary drum, tangentially led out, and enters the mesh chain transition section 2b. Then the mesh chain tangentially enters the circular-arc guide surface 1f1 of the right drum guide element 1f, spirals down obliquely, and enters the inclined-arc guide surface 1f2 of the right drum guide element 1f. The driving poles 1d evenly distributed along the circumference of the right rotary drum hook the drive heads 2f of the mesh chain 2 close to the inner side of the rotary drum. The mesh chain 2 is driven to rotate around the rotary drum and descend to the bottom of the right rotary drum. The mesh chain is tangentially led out and enters the mesh chain output section 2c. The mesh chain moves to the right and is steered through the right steering wheel 16 to move to the left to enter the mesh chain return section 2d and the mesh chain tension section 2e. Then the mesh chain bypasses the left steering wheel 15 and re-enters the mesh chain input section 2a. In this way, the long-distance continuous cycle rotation of the mesh chain 2 in the double-tower structure is realized.

Centers of the two rotary drums each are supported on frame 21 through central shaft 1a. Bottoms of the two rotary drums each are fixed with drum sprocket 1c. Main drive sprocket 18 and tensioning sprocket 19 are arranged between the two drum sprockets 1c. Transmission chain 3 bypasses the main drive sprocket 18 and the tensioning sprocket 19 in an S-shape and is connected with the two drum sprockets 1c in a transmission manner. The main drive sprocket 18 is provided on an output shaft of main drive motor reducer 17. The main drive motor reducer 17 is fixed to the nearby frame 21.

Figure 18:
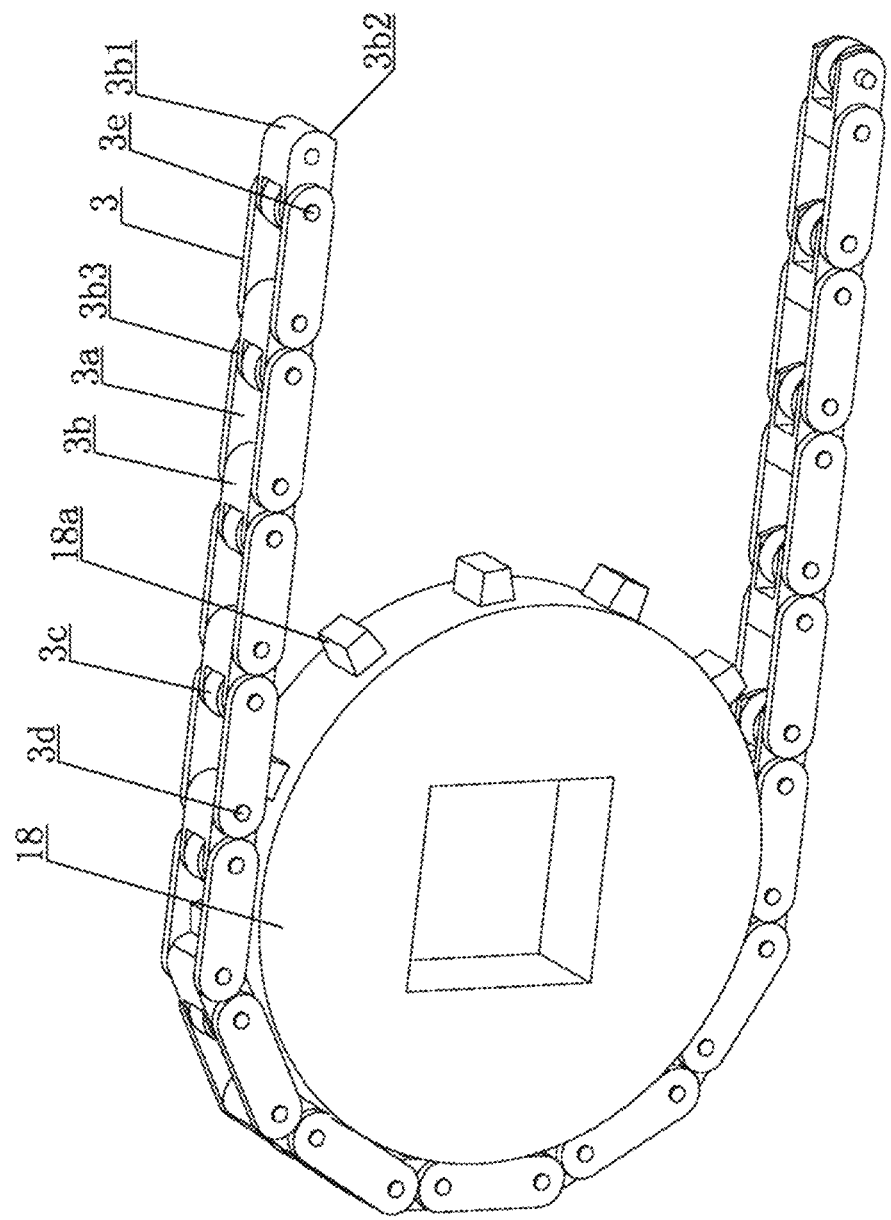
FIG. 18 shows Embodiment 1 of a transmission chain according to the present disclosure.
Figure 19:
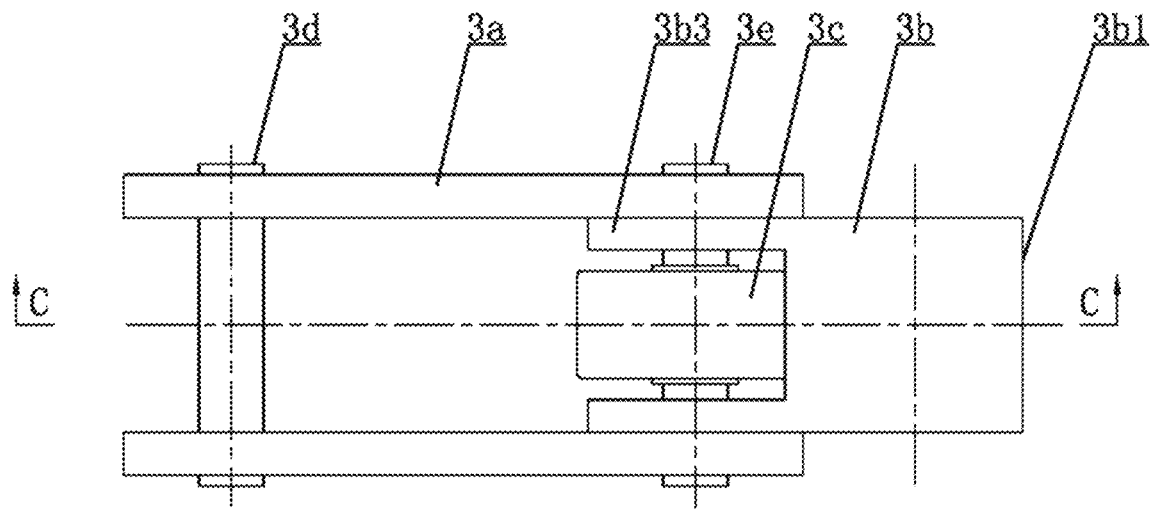
FIG. 19 is a top view of a chain link shown in FIG. 18.
Figure 20:
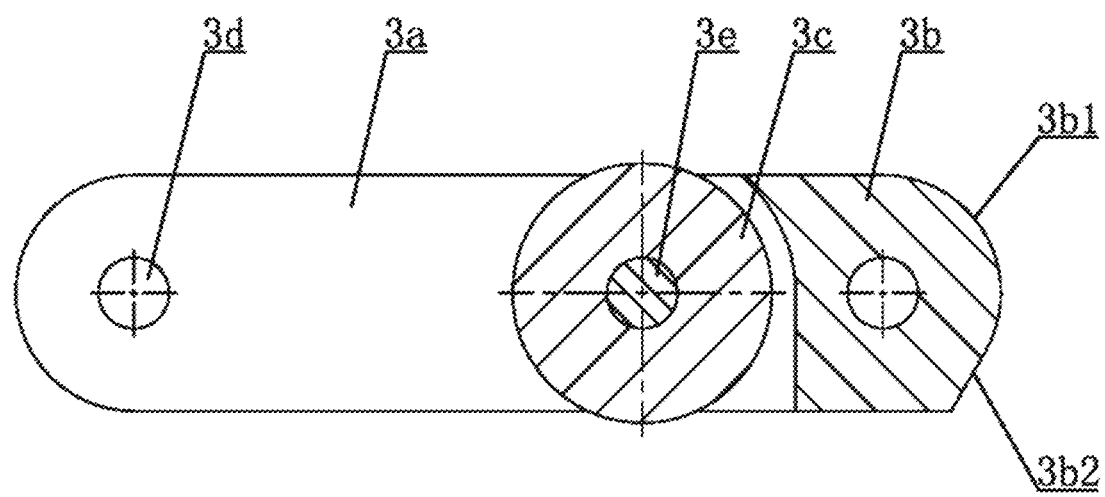
FIG. 20 is a section view taken along line C-C shown in FIG. 19.

As shown in FIGS. 18 to 20, the transmission chain 3 includes multiple chain links connected in turn. Each chain link includes a pair of mutually parallel outer chain plates 3a. Ends of the outer chain plates 3a of each two adjacent chain links are hinged to each other through inner joint 3b. The left end of the inner joint 3b is provided with a pair of mutually parallel inner chain plates 3b3. The inner chain plates 3b3 are attached to the inner sides of the right ends of a previous pair of outer chain plates and connected. A right end of the inner joint 3b is provided with engaging end 3b1. The engaging end 3b1 is located between the left ends of a subsequent pair of outer chain plates and is hinged to the left ends through first chain pin 3d. The engaging end 3b1 is provided with oblique engaging surface 3b2. The oblique engaging surface 3b2 at a lower part of the engaging end 3b1 engages with a trapezoidal tooth of the main drive sprocket 18. The design can bear a relatively large load, realize reliable transmission, prevent slippage, and is applicable on a heavy-load traction conveyor in other scenarios.

Roller 3c is provided between the two inner chain plates 3b3. The roller 3c is provided in a central part of second chain pin 3e. Two ends of the second chain pin 3e respectively pass through pin holes of the inner chain plates 3b3 and are riveted to the right ends of the previous pair of outer chain plates respectively. The outer chain plates 3a and the inner chain plates 3b3 can be prepared separately. The inner chain plates 3b3 are hinged to the right ends of the previous pair of outer chain plates through the second chain pin 3e. Each chain link of the transmission chain 3 can also be provided with two chain pins and two engaging surfaces. The tooth of the drum sprocket 1c engages with the roller 3c on the second chain pin 3e. The trapezoidal tooth of the main drive sprocket 18 engages with the oblique engaging surface 3b2 at the lower part of the engaging end 3b1. The design improves the bearing capacity and prolongs the service life of the transmission chain 3.

Figure 21:
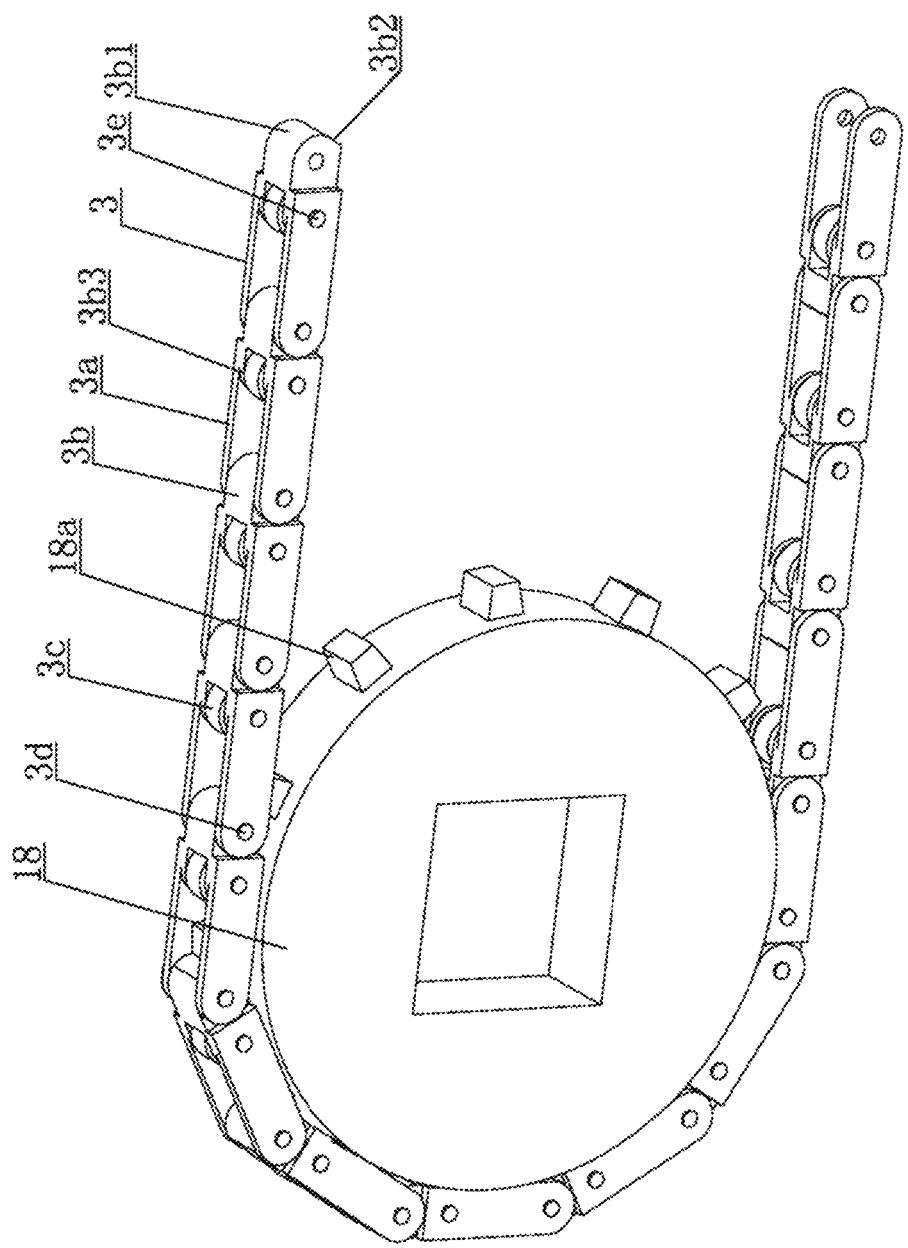
FIG. 21 shows Embodiment 2 of the transmission chain according to the present disclosure.

FIG. 21 shows another implementation of the transmission chain 3. The inner chain plates 3b3 can be connected with the right ends of the previous pair of outer chain plates 3a as a whole.

The roller 3c engages with the tooth of the drum sprocket 1c, and the tooth of the main drive sprocket 18 is trapezoidal. A slope of the trapezoidal tooth engages with the oblique engaging surface 3b2 at the lower part of the engaging end.

Another drive mode can be adopted for the rotary drums, namely, the left rotary drum and the right rotary drum are synchronously driven by two linked servo motors.

Another drive mode can be adopted for the rotary drums, that is, the left rotary drum and the right rotary drum share one main drive motor reducer 17. Two main drive sprockets 18 are provided on the output shaft of the main drive motor reducer 17. The two main drive sprockets 18 drive the drum sprockets 1c through respective transmission chains.

As shown in FIGS. 1, 3, 24, and 25, the mesh chain return section 2d is provided with a mesh chain tensioner located between the two rotary drums. The mesh chain tensioner includes two fixed-shaft tensioning wheels 9. Floating tensioning wheel 10 is provided between the two fixed-shaft tensioning wheels 9. The mesh chain tension section 2e bypasses the fixed-shaft tensioning wheel 9 on the right, the floating tensioning wheel 10 and the fixed-shaft tensioning wheel 9 on the left in turn. Counterweight 11 is suspended on a moving shaft of the floating tensioning wheel 10.

The mesh chain 2 is very long. The mesh chain tensioner can properly tension the mesh chain 2 to create a pretensioning force to reduce the sag of the mesh chain and compensate for the length change of the mesh chain caused by the tension or thermal expansion and contraction. The left and right ends of the counterweight 11 each are embedded in a centralizing guide slot of centralizing guide rail 12 through counterweight centralizing wheel 11b. This can prevent the counterweight 11 from shaking back and forth during lifting and reduce the resistance of the counterweight 11 during lifting. When the tension of the mesh chain return section 2d is too small, the counterweight 11 moves downward and stores more chain links of the mesh chain. On the contrary, the counterweight 11 moves upward.

The left and right sides of the counterweight 11 are provided with two centralizing guide rails 12 that are symmetrical and parallel with each other. The two centralizing guide rails 12 are provided with centralizing guide slots extending vertically and with opposite openings. The left and right ends of the counterweight 11 are respectively provided with two outwardly extending counterweight centralizing rods 11a. Outer ends of the two counterweight centralizing rods 11a are respectively provided with two counterweight centralizing wheels 11b. The two counterweight centralizing wheels 11b are respectively located in the centralizing guide slots of the centralizing guide rails 12. Two ends of the moving shaft of the floating tensioning wheel 10 are respectively suspended with two traction springs 10a that are symmetrical with each other. The lower ends of the two traction springs 10a are respectively hinged to the counterweight centralizing rods 11a.

The fixed-shaft tensioning wheel 9 positioned downstream of the floating tensioning wheel 10 is a driving wheel fixed to tensioning wheel drive shaft 9a. An output end of tensioner motor 13 drives the tensioning wheel drive shaft 9a through one-way bearing 14. A traction force generated by the driving fixed-shaft tensioning wheel adapts to the weight of the counterweight 11 and sag of the mesh chain 2.

The shaft of the floating tensioning wheel is flexibly connected with the counterweight centralizing rod 11a through the traction spring 10a to reduce the impact load during tensioning floating and avoid excessive fluctuation of the mesh chain. The output end of the tensioner motor 13 drives the tensioning wheel drive shaft 9a through the one-way bearing 14. When the traveling speed of the mesh chain 2 is greater than the speed of the driving tensioning wheel, the one-way bearing 14 slips to avoid interference. The speed of the tensioner motor 13 depends on the sag of the mesh chain 2 and the weight of the counterweight 11. An ideal state is to balance 90-100% of the weight of the counterweight to avoid the weight of the counterweight 11 bringing the additional load to the mesh chain 2, which affects the slack conveyance of the mesh chain 2. The sag of the mesh chain 2 is controlled within a set range.

Figure 22:
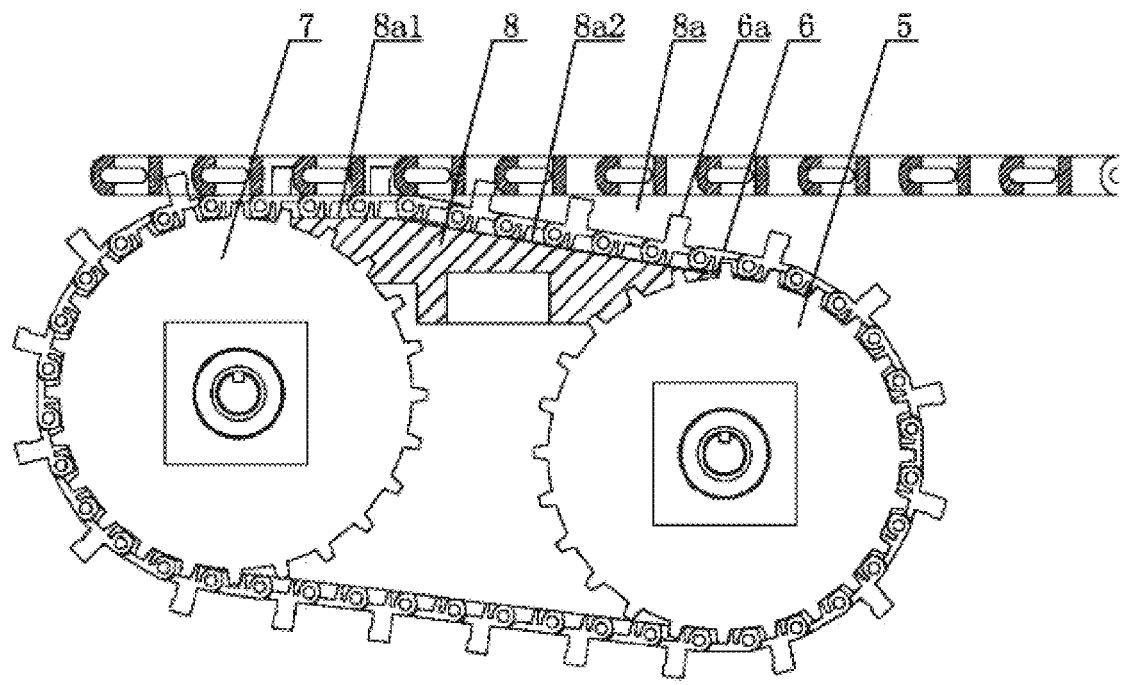
FIG. 22 is a front view of a slat chain that assists in driving a mesh chain transition section.
Figure 23:
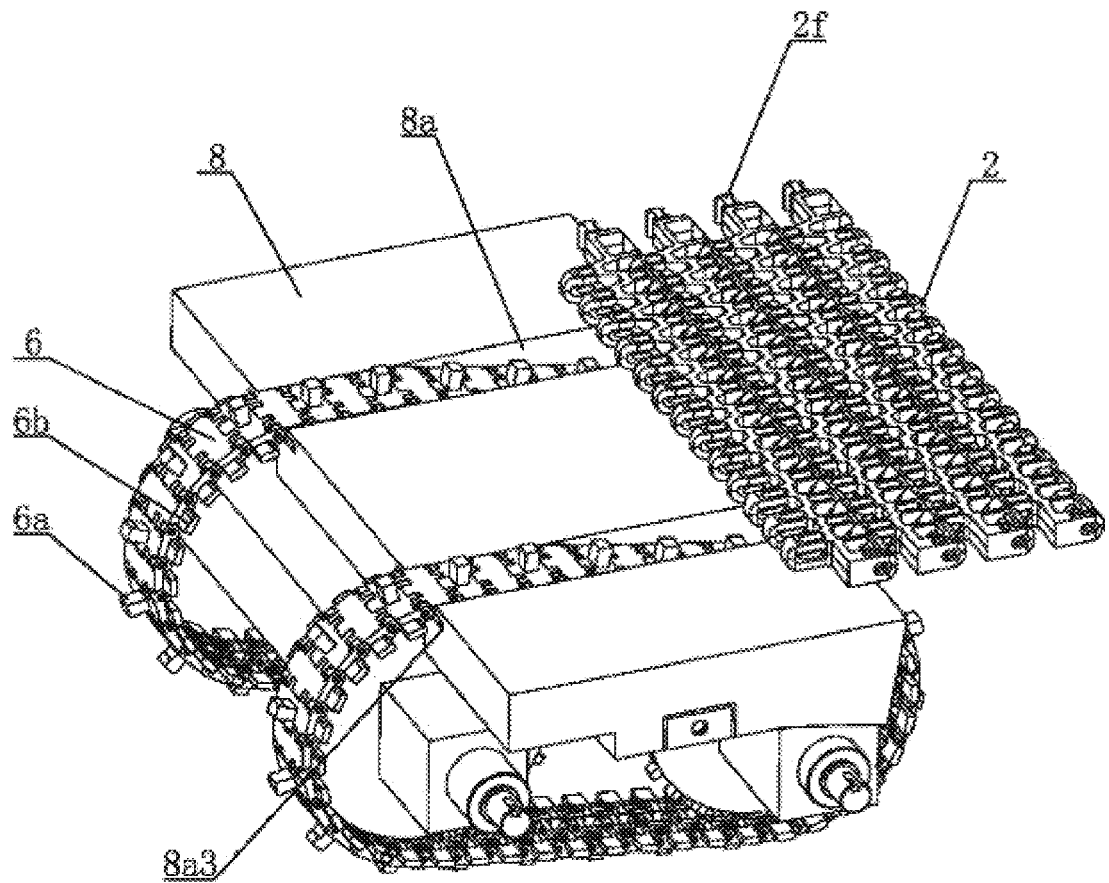
FIG. 23 is a stereoscopic view of the slat chain shown in FIG. 22.
Figure 24:
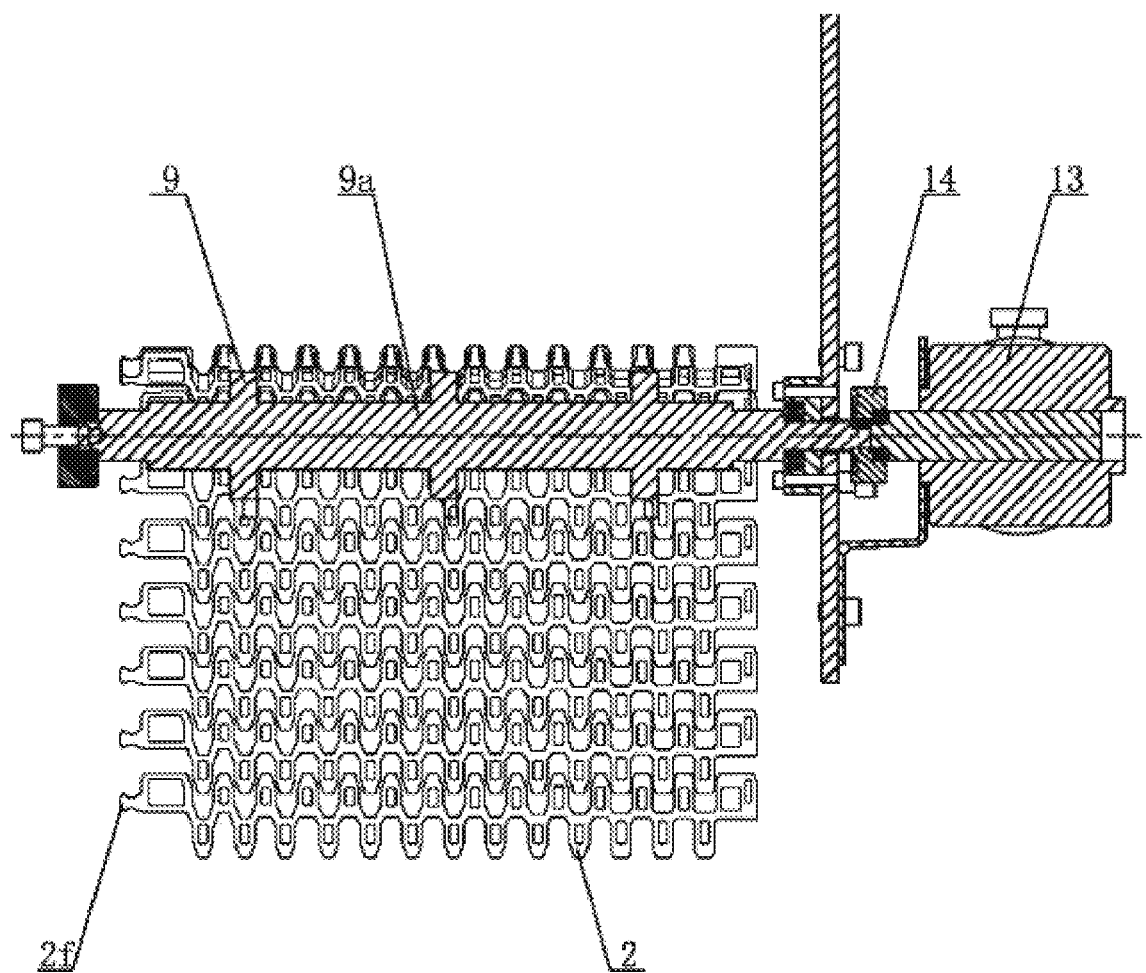
FIG. 24 is a front view of a tensioner motor that drives a mesh chain tension section.
Figure 25:
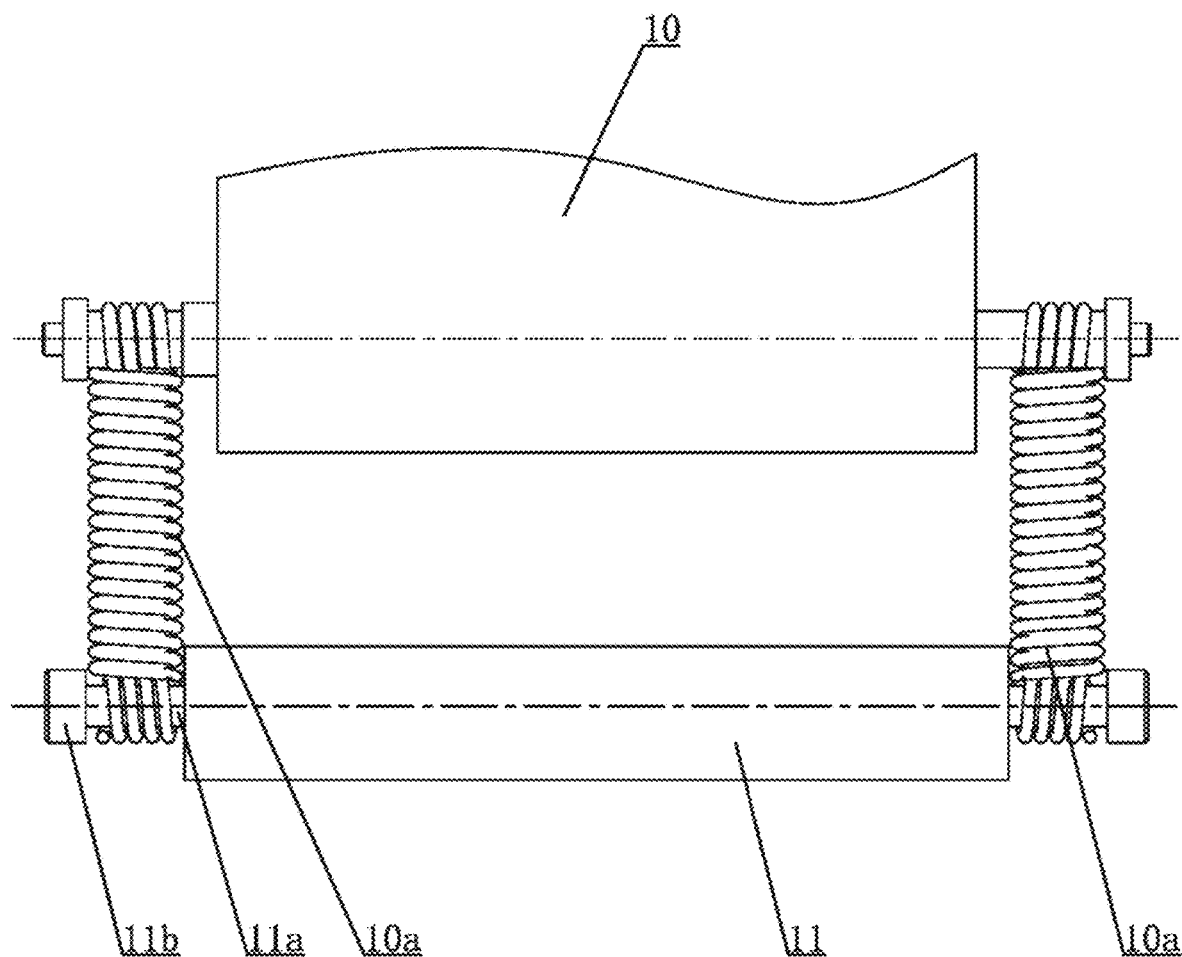
FIG. 25 is a schematic diagram showing a floating tensioning wheel that suspends a counterweight through a traction spring.

As shown in FIGS. 22 and 23, at least one slat chain 6 is provided below the mesh chain transition section 2b. The slat chain 6 wraps around slat chain drive wheel 5 and slat chain driven wheel 7. The shaft of the slat chain drive wheel 5 is driven by the output shaft of slat chain drive motor 4 through a one-way bearing. The tight side of the slat chain 6 is attached to the bottom of the mesh chain transition section 2b and travels in the same direction. The central part of each chain link of the slat chain 6 is provided with upwardly extending slat chain tooth 6a. The slat chain tooth 6a on the tight side is correspondingly embedded in a slot of the chain link of the mesh chain at the mesh chain transition section 2b.

The slat chain 6 is provided in the mesh chain transition section 2b between the two spiral towers. According to the width of the mesh chain, there may be one slat chain 6 or may be two slat chains arranged symmetrically. The slat chain drive motor 4 drives the slat chain drive wheel 5 through a one-way bearing. The slat chain drive motor 4 can be torque-controlled, and the one-way bearing can be driven to ensure that the slat chain 6 compensates the driving force of the mesh chain transition section 2b without interference. The slat chain drive wheel 5 drives the slat chain 6 and the mesh chain transition section 2b to travel forward in the same direction. The slat chain tooth 6a on the slat chain 6 engages with the corresponding chain link of the mesh chain transition section to apply an auxiliary driving force to the mesh chain transition section 2b to compensate for a synchronization error between the two towers.

Swing rail 8 is provided below the mesh chain transition section 2b. The top surface of the swing rail 8 is horizontal and supported at the bottom of the mesh chain 2. The central part of the top surface of the swing rail 8 is provided with swing rail sink 8a extending along the forward direction of the mesh chain 2. The tight side of the slat chain 6 is embedded in the swing rail sink 8a. The swing rail sink 8a can include horizontal section 8a1 and inclined section 8a2 that are in a smooth fit. The inclined section 8a2 inclines downward along the forward direction of the tight side of the slat chain. The tight side of the slat chain 6 nestles on the bottom of the swing rail sink 8a and inclines downward to move forward. The slat chain drive wheel 5 is located at an outlet of the inclined section 8a2. The pitch circle of the slat chain drive wheel 5 is tangential to the bottom wall of the inclined section 8a2.

The swing rail 8 can support the weight of the mesh chain transition section 2b to avoid its sagging. The swing rail sink 8a provides space for the slat chain 6. The slat chain tooth 6a engages with the mesh chain 2 at the horizontal section 8a1 to generate a driving force. At this time, the front slat chain tooth 6a enters the inclined section 8a2, gradually sinks, and leaves the slot of the mesh chain 2. The slat chain tooth 6a that travels to the end of the inclined section 8a2 is completely separated from the mesh chain 2 and enters the arc section of the slat chain drive wheel 5. When the slat chain 6 enters the arc section, the distance between the tops of each two adjacent slat chain teeth 6a is greater than the distance between the bottoms thereof. If the slat chain tooth is still engaged at this time, interference will occur. In the present disclosure, the horizontal section 8a1 and the inclined section 8a2 are arranged in front of the slat chain drive wheel 5. When the slat chain 6 passes through the junction of the horizontal section 8a1 and the inclined section 8a2, the change in the distance between the tops of each two adjacent slat chain teeth 6a is much smaller than the change of the arc section. The design ensures the engagement drive of the slat chain tooth 6a at the horizontal section 8a1 and ensures that the driven slat chain tooth 6a can be smoothly disengaged.

Limiting slots 8a3 are symmetrically arranged at the front and back sides of the bottom of the swing rail sink 8a, such that the swing rail sink 8a is provided with an inverted T-shaped cross-section. The front and back sides of the bottom of each chain link of the slat chain 6 are symmetrically provided with slat chain limiting flashes 6b extending outwards. The slat chain limiting flashes 6b on the front and back sides of the tight side of the slat chain are symmetrically embedded in the limiting slots 8a3 at the bottom of the swing rail sink 8a. The slat chain limiting flashes 6b at the front and back sides of the slat chain 6 are embedded in the limiting slots 8a3 of the swing rail 8. Thus, the slat chain 6 is restricted to the bottom of the swing rail sink 8a to avoid jumping (e.g., a slat chain tooth 6a failing to engage with a slot). Meanwhile, when the slat chain 6 moves forward along the bottom of the inclined section 8a2, the slat chain tooth 6a is forced to disengage from the slot of the mesh chain transition section 2b to avoid jamming of the mesh chain 2.

When the slat chain tooth 6a engages with the end of the chain link of the mesh chain 2, the top of the slat chain tooth 6a is higher than the upper edge of the chain pin of the mesh chain 2, and an engaging surface of the slat chain tooth 6a protrudes in the forward direction. Through the design, it is easy to apply a component force to the top surface of the swing rail while applying forward power to the mesh chain 2, such that the mesh chain 2 is stably supported on the swing rail 8 to avoid jumping.

In operation, it is still satisfactory when only one slat chain tooth 6a can effectively drive the mesh chain 2. The pitch of slat chain 6 is smaller than that of mesh chain 2. For example, the pitch of the slat chain is 1 mm smaller than the pitch of the mesh chain. When multiple pitches are moved, there is a certain clearance between the engaging surfaces of the previous section. When the slat chain tooth 6a at the horizontal section 8a1 is in an engaging drive state, the slat chain tooth 6a entering the inclined section 8a2 can smoothly disengage from the slot of the mesh chain 2, further reducing the possibility of interference.

Figure 5:
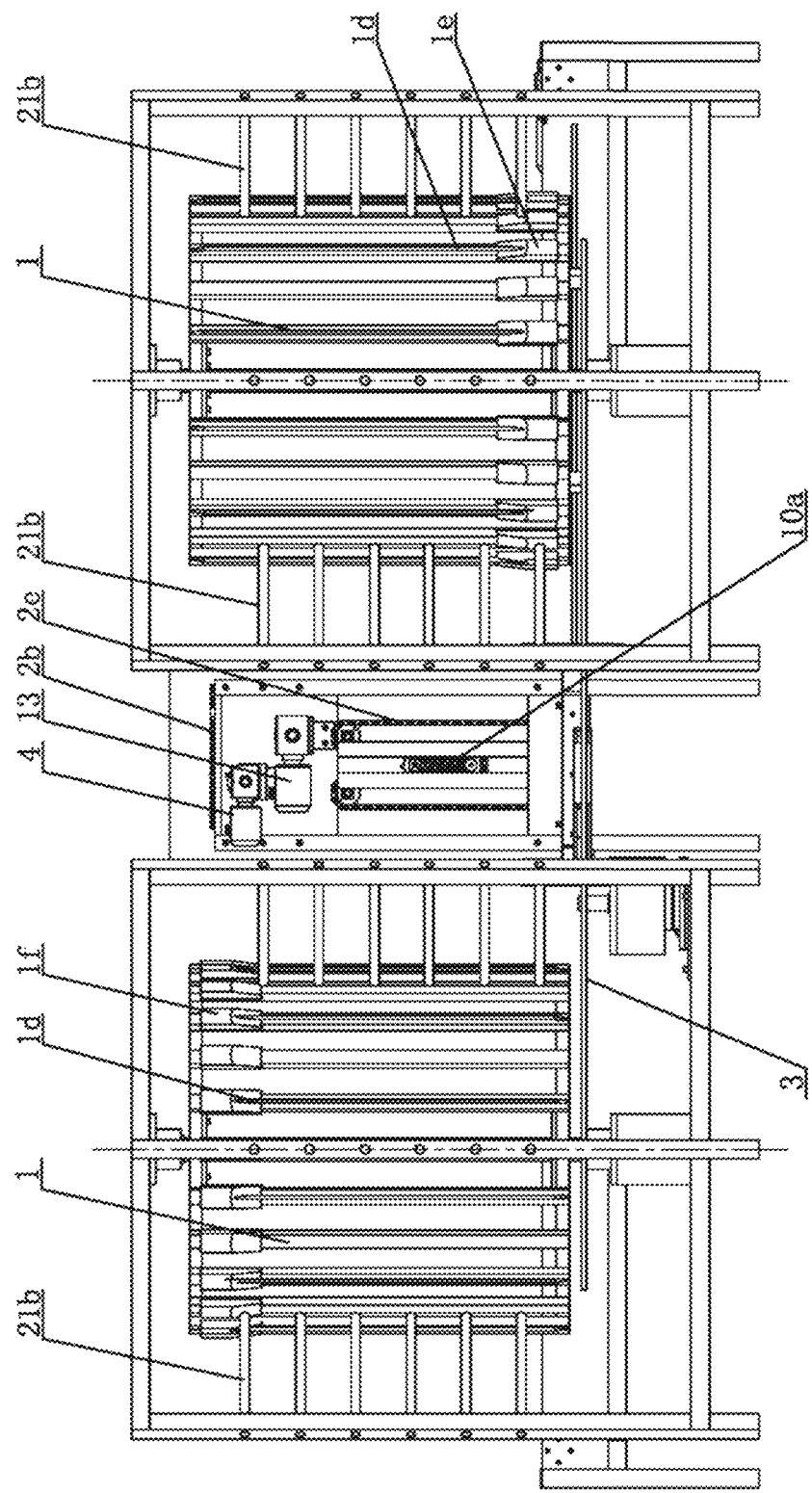
FIG. 5 is a back view of the spiral conveyor shown in FIG. 3.
Figure 6:
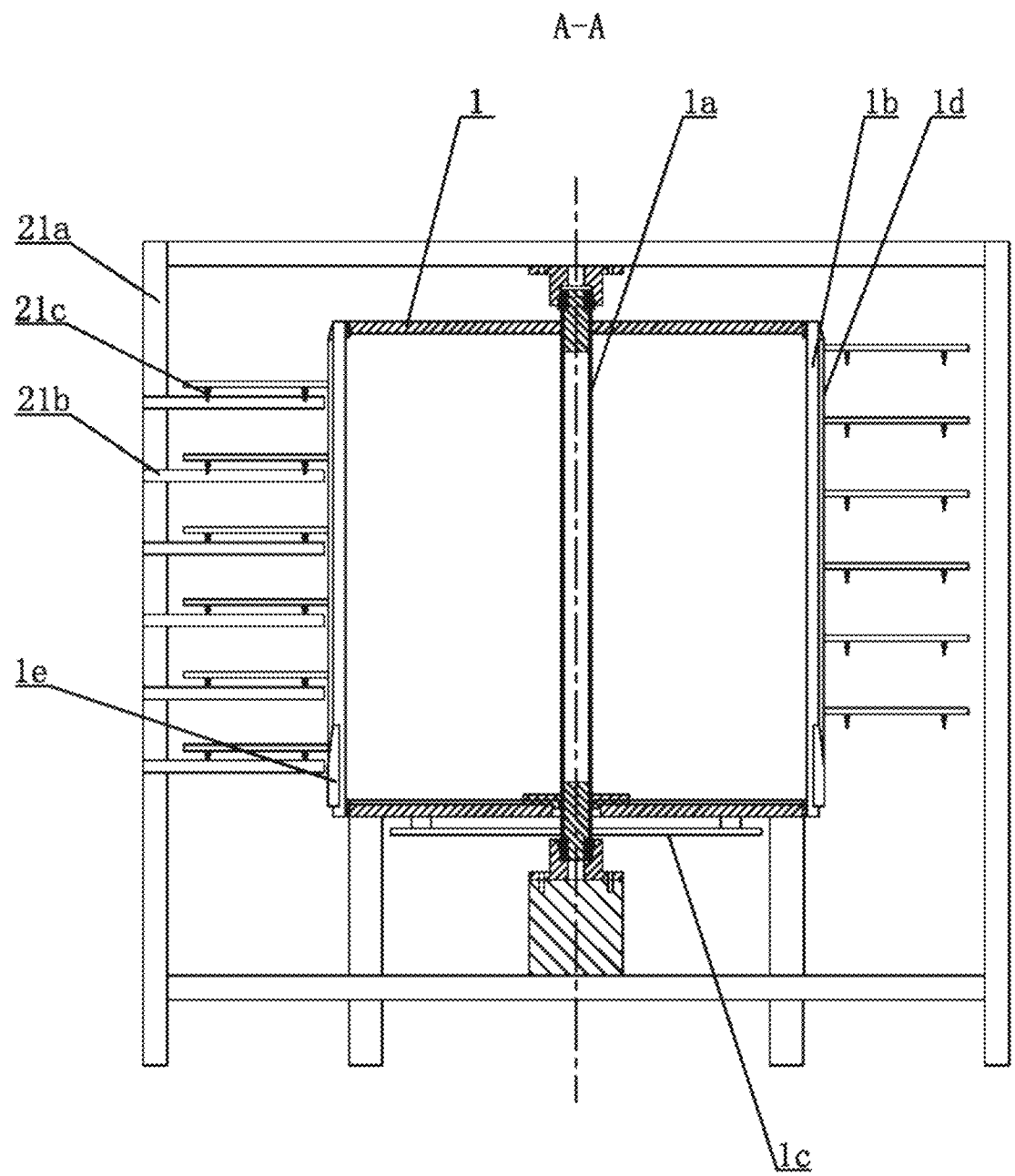
FIG. 6 is a section view taken along line A-A shown in FIG. 4.
Figure 7:
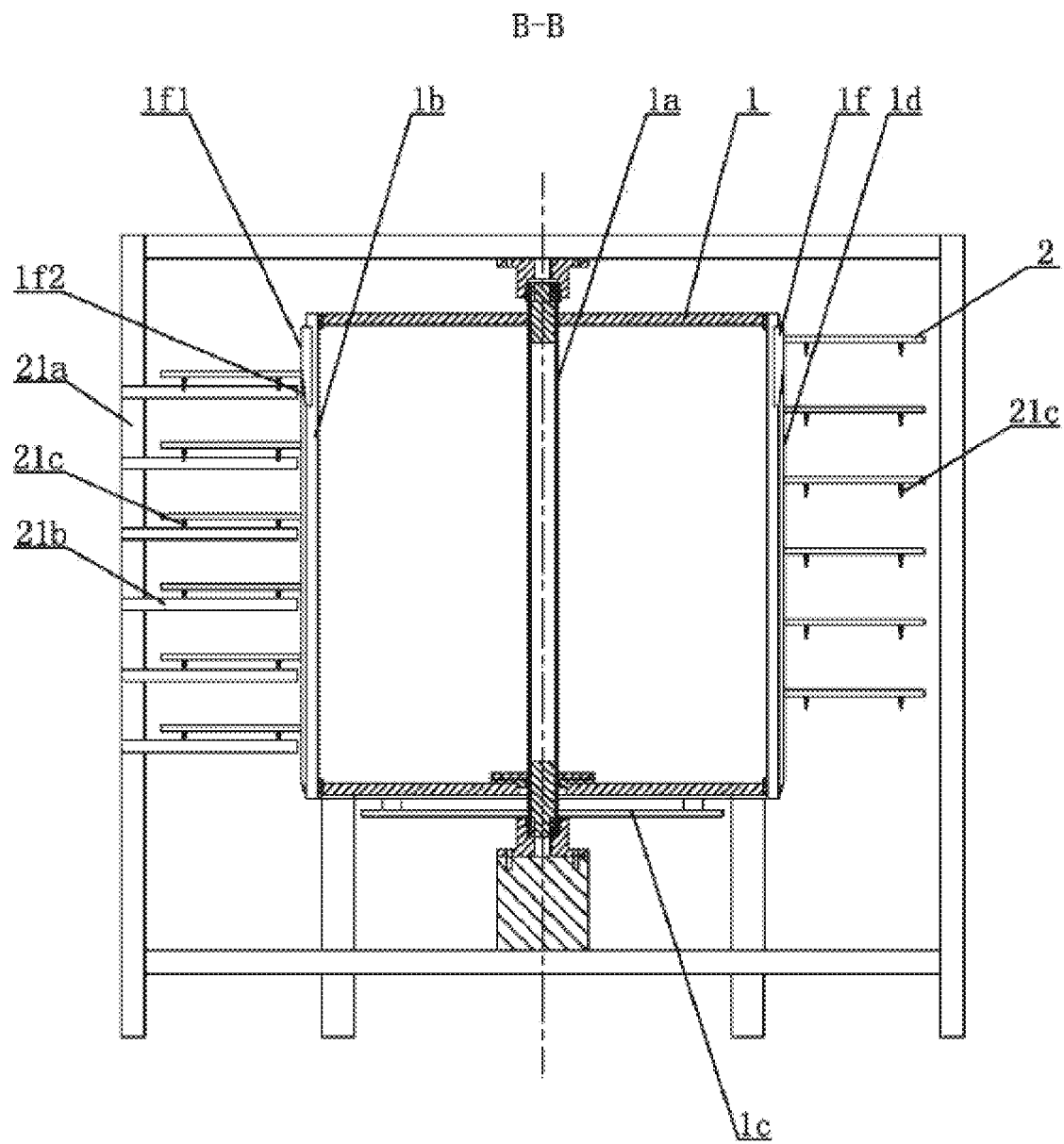
FIG. 7 is a section view taken along line B-B shown in FIG. 4.

As shown in FIG. 5, the left drum guide element 1e and right drum guide element 1f each are provided with a circular-arc guide surface and an inclined-arc guide surface that are in a smooth fit. The circular-arc guide surface is coaxial with the rotary drum and has a radius equal to or less than the radius of the rotary drum. The central part of the inclined-arc guide surface in the width direction is provided with an inclined-arc surface slot extending vertically. The inclined-arc guide surface of the left drum guide element 1e faces upward. The lower end of the driving pole 1d of the left rotary drum is inserted into the inclined-arc slot of the left drum guide element 1e. The inclined-arc guide surface of the right drum guide element 1f faces downward. The upper end of the driving pole 1d of the right rotary drum is inserted into the inclined-arc slot of the right drum guide element 1f.

The left steering wheel 15, the right steering wheel 16, and the fixed-shaft tensioning wheel 9 along the mesh chain 2 can be polygonal sprockets. The left steering wheel 15 is a driving wheel and is driven by auxiliary motor 20 of the mesh chain. The polygonal sprockets are used to replace the traditional smooth wheels, and the polygonal sprockets are mated with each chain link of the mesh chain 2. The left steering wheel 15 can be driven by the auxiliary motor 20 of the mesh chain to compensate for the lack of power caused by the long-distance conveyance of the mesh chain to avoid difficulties in conveyance.

The above described are merely preferred possible embodiments of the present disclosure and should not be construed as a limitation to the protection scope of the present disclosure. The disclosure may have other implementations in addition to those described above. All technical solutions formed by equivalent replacements or equivalent transformations should fall within the protection scope of the present disclosure. The technical features that are not described herein can be implemented by or using the existing technology and will not be repeated herein.

What is claimed is:

1. A spiral conveyor comprising rotary drums, wherein a mesh chain is spirally wound around an outer circumference of each of the rotary drums and rotates synchronously with each of the rotary drums; an inner side of each chain link of the mesh chain close to the rotary drum is provided with a plurality of drive heads extending toward a drum body of the rotary drum; each of the plurality of drive heads is provided with a convex-arc edge and comprises an arc slot provided on each of two sides or on a single side of the drive head and coinciding with a driving pole of a plurality of driving poles; the plurality of driving poles are evenly distributed around the outer circumference of the rotary drum and engage with the plurality of drive heads of each layer; a bottom of the mesh chain of each layer is supported on a spiral ring rail to allow sliding; the spiral ring rail of each layer is fixed to radial support rods; the radial support rods each comprises an outer end fixed to a vertical post of a plurality of vertical posts; and the plurality of vertical posts are evenly distributed around an axis of the rotary drum, wherein an arc-shaped limiting plate is provided below a turning transition section, and the mesh chain turns and moves forward along a limiting arc of the arc-shaped limiting plate; a radius of the limiting arc is equal to or less than a distance between a head end of the limiting arc and the axis of the rotary drum; and an axis of the limiting arc deviates from the axis of the rotary drum, such that a distance between a tail end of the limiting arc and the axis of the rotary drum is less than the distance between the head end of the limiting arc and the axis of the rotary drum.

2. The spiral conveyor according to claim 1, wherein the mesh chain enters an arc spiral section from a straight travel section through a turning transition section; chain pins at the straight travel section are parallel with each other, and chain pins at the arc spiral section are distributed in a fan shape; an outer side of the mesh chain at the turning transition section forces a loose inner side of the mesh chain to adjust its position; and when the inner side of the mesh chain adapts to a perimeter of the outer side of the mesh chain, the plurality of drive heads on the inner side of the mesh chain engages with the plurality of driving poles.

3. The spiral conveyor according to claim 1, wherein an outer side of each chain link of the mesh chain is provided with a downwardly extending limiting protrusion; and each limiting protrusion slides against an outer arc surface of the arc-shaped limiting plate.

4. The spiral conveyor according to claim 3, wherein each chain link of the mesh chain is provided with a first pin hole and a second pin hole running along a width direction of the mesh chain; cross sections of the first pin hole and the second pin hole are oval-shaped extending along a forward direction of the mesh chain; front side walls of first pin holes of multiple chain teeth on the outer side of the mesh chain incline forward along a slope; and back side walls of second pin holes of the multiple chain teeth on the outer side of the mesh chain incline backward along another slope.

5. The spiral conveyor according to claim 1, wherein an outer side of each chain link of the mesh chain is provided with a downwardly extending limiting protrusion; a bottom of an outer arc surface of the arc-shaped limiting plate is provided with an outwardly extending limiting flash; multiple limiting rollers or limiting balls are fixed to the limiting flash; and each limiting protrusion slides against one of the limiting rollers or the limiting balls.

6. The spiral conveyor according to claim 1, wherein an outer side of each chain link of the mesh chain is provided with a downwardly extending limiting shaft; each limiting shaft is provided thereon with a limiting bearing; and each limiting bearing slides against an outer arc surface of the arc-shaped limiting plate.

7. The spiral conveyor according to claim 1, wherein an outer side of each chain link of the mesh chain is provided with a downwardly extending chain lug; a free end of each lug is provided with a limiting roller or limiting ball; and each limiting roller or limiting ball slides against an outer arc surface of the arc-shaped limiting plate.

8. The spiral conveyor according to claim 1, wherein multiple vertical drum rods are evenly arranged along a circumference of each of the rotary drums; and each driving pole is fixed to an outer vertical surface of the vertical drum rod.

9. The spiral conveyor according to claim 8, wherein one end of each vertical drum rod is fixed with a guide element; the guide element is located at a bottom of the rotary drum of an ascending spiral or at a top of the rotary drum of a descending spiral; each guide element is provided with a circular-arc guide surface and an inclined-arc guide surface in a smooth fit; the circular-arc guide surface is coaxial with the rotary drum, and has a radius equal to or less than a radius of the rotary drum; the circular-arc guide surface in the ascending spiral is downward, and the circular-arc guide surface in the descending spiral is upward; each driving pole in the ascending spiral is inserted from a central part of the inclined-arc guide surface in a width direction and extends to a bottom of the circular-arc guide surface; each driving pole in the descending spiral is inserted from a central part of the inclined-arc guide surface in a width direction and extends to a top of the circular-arc guide surface; an outer edge of each driving pole is tangential to the circular-arc guide surface; an outer side of the mesh chain at a turning transition section forces a loose inner side of the mesh chain to adjust a position; and the inner side of the mesh chain slides along the circular-arc guide surface of the guide element until the inner side of the mesh chain contacts a perimeter of the outer side of the mesh chain, engaging the drive head on the inner side of the mesh chain with the driving pole.

10. The spiral conveyor according to claim 8, wherein one end of each vertical drum rod is fixed with a floating element; the floating element is located at a bottom of the rotary drum in an ascending spiral or at a top of the rotary drum in a descending spiral; the floating element is provided with an arc ridge inclining towards a forward direction of the mesh chain; a lower end of each driving pole in the ascending spiral is connected to the arc ridge, and an upper end of each driving pole in the descending spiral is connected to the arc ridge; an outer edge of each arc ridge is flush with or higher than an outer edge of the driving pole; an outer side of the mesh chain at a turning transition section forces a loose inner side of the mesh chain to adjust a position; and the inner side of the mesh chain slides along the arc ridge of the floating element until the inner side of the mesh chain contacts a perimeter of the outer side of the mesh chain, engaging the drive head on the inner side of the mesh chain with the driving pole.

11. The spiral conveyor according to claim 10, wherein a back surface of the floating element is embedded in a vertical slot of the vertical drum rod; a central part of the vertical slot in a width direction is provided with a vertical projection; the vertical projection is embedded in a floating slot on the back surface of the floating element; and a floating spring comprises one end embedded in the vertical projection and the other end embedded in a counterbore of the floating element.

12. The spiral conveyor according to claim 2, wherein an inlet of the turning transition section is provided with an inner sprocket and an outer sprocket; the inner sprocket engages with the inner side of the chain link of the mesh chain; the outer sprocket engages with an outer side of the chain link of the mesh chain; the inner sprocket has a same speed and a same number of teeth as the outer sprocket; and a pitch diameter of the outer sprocket is larger than a pitch diameter of the inner sprocket.

13. The spiral conveyor according to claim 9, wherein there are two rotary drums arranged side by side, including a left rotary drum and a right rotary drum; a mesh chain input section moves to the right to enter the turning transition section, then enters an ascending spiral of the left rotary drum, and tangentially moves to the right to enter a mesh chain transition section from an upper part of the left rotary drum; the mesh chain transition section moves to the right to enter the turning transition section, then enters a descending spiral of the right rotary drum, and tangentially moves to the right to enter a mesh chain output section from a lower part of the right rotary drum; the mesh chain output section passes a right steering wheel and moves to the left to enter a mesh chain return section; and a left end of the mesh chain return section bypasses a left steering wheel and is connected with the mesh chain input section.

14. The spiral conveyor according to claim 2, wherein the two rotary drums each comprise a center supported on a frame through a central shaft and a bottom fixed with a drum sprocket; a main drive sprocket and a tensioning sprocket are arranged between the two drum sprockets; a transmission chain bypasses the main drive sprocket and the tensioning sprocket and is connected with the two drum sprockets in a transmission manner; each chain link of the transmission chain comprises a pair of mutually parallel outer chain plates; ends of the outer chain plates of each two adjacent chain links are hinged to each other through an inner joint; a left end of the inner joint is provided with a pair of mutually parallel inner chain plates; each pair of inner chain plates are attached to inner sides of right ends of a previous pair of outer chain plates and are connected with each other; a right end of the inner joint is provided with an engaging end; the engaging end is located between and hinged to left ends of a subsequent pair of outer chain plates through a first chain pin; the engaging end is provided with an oblique engaging surface; the main drive sprocket is provided with a trapezoidal tooth; and a slope of the trapezoidal tooth engages with the oblique engaging surface at a lower part of the engaging end.

15. The spiral conveyor according to claim 14, wherein a roller is provided between each pair of inner chain plates, and is provided in a central part of a second chain pin; two ends of the second chain pin respectively pass through pin holes of the inner chain plates, and are riveted to the right ends of the previous pair of outer chain plates respectively; and the inner chain plates are integrally connected with, or through the second chain pin, are hinged to the right ends of the previous pair of outer chain plates.

16. The spiral conveyor according to claim 14, wherein at least one slat chain is provided below a mesh chain transition section; the slat chain wraps around a slat chain drive wheel and a slat chain driven wheel; a shaft of the slat chain drive wheel is driven by an output shaft of a slat chain drive motor through a one-way bearing; a tight side of the slat chain is attached to a bottom of the mesh chain transition section, and moves forward in a same direction as the mesh chain transition section; a central part of each chain link of the slat chain is provided with an upwardly extending slat chain tooth; and the slat chain tooth on the tight side is correspondingly embedded in a slot of the chain link of the mesh chain at the mesh chain transition section.

17. The spiral conveyor according to claim 16, wherein a swing rail is provided below the mesh chain transition section; a top surface of the swing rail is horizontal and supported at the bottom of the mesh chain; a central part of the top surface of the swing rail is provided with a swing rail sink extending along a forward direction of the mesh chain; the tight side of the slat chain is embedded in the swing rail sink; the swing rail sink comprises a horizontal section and an inclined section that are in a smooth fit; the inclined section inclines downward along the forward direction of the tight side of the slat chain; the tight side of the slat chain nestles on a bottom of the swing rail sink, and inclines downward to move forward; the slat chain drive wheel is located at an outlet of the inclined section; and a pitch circle of the slat chain drive wheel is tangential to a bottom wall of the inclined section.

18. The spiral conveyor according to claim 17, wherein limiting slots are symmetrically arranged at front and back sides of the bottom of the swing rail sink, such that the swing rail sink is provided with an inverted T-shaped cross-section; outwardly extending slat chain limiting flashes are symmetrically arranged on front and back sides of a bottom of each chain link of the slat chain; the slat chain limiting flashes on the front and back sides of the tight side of the slat chain are symmetrically embedded in the limiting slots at the bottom of the swing rail sink; when the slat chain tooth engages with an end of the chain link of the mesh chain, a top of the slat chain tooth is higher than an upper edge of the chain pin of the mesh chain, and an engaging surface of the slat chain tooth protrudes in the forward direction; and a pitch of the slat chain is less than a pitch of the mesh chain.

19. The spiral conveyor according to claim 13, wherein the mesh chain return section is provided with a mesh chain tensioner located between the two rotary drums; the mesh chain tensioner comprises two fixed-shaft tensioning wheels; a floating tensioning wheel is provided between the two fixed-shaft tensioning wheels; a mesh chain tension section bypasses a right fixed-shaft tensioning wheel, the floating tensioning wheel, and a left fixed-shaft tensioning wheel in turn; a counterweight is suspended on a moving shaft of the floating tensioning wheel; left and right sides of the counterweight are provided with two centralizing guide rails that are symmetrical and parallel with each other; the two centralizing guide rails are provided with centralizing guide slots that extend vertically and are provided with opposite openings; left and right ends of the counterweight are respectively provided with two outwardly extending counterweight centralizing rods; outer ends of the two counterweight centralizing rods are respectively provided with two counterweight centralizing wheels; the two counterweight centralizing wheels are respectively located in the centralizing guide slots of the centralizing guide rails; two ends of the moving shaft of the floating tensioning wheel are respectively suspended with two traction springs that are symmetrical with each other; and lower ends of the two traction springs are respectively hinged to the counterweight centralizing rods; and the fixed-shaft tensioning wheel downstream of the floating tensioning wheel is a driving wheel fixed to a tensioning wheel drive shaft; an output end of a tensioner motor drives the tensioning wheel drive shaft through a one-way bearing; and a traction force generated by the driving fixed-shaft tensioning wheel adapts to a weight of the counterweight and a sag of the mesh chain.

\* \* \* \* \*